US008686162B2

(12) United States Patent
Dershem

(10) Patent No.: US 8,686,162 B2
(45) Date of Patent: Apr. 1, 2014

(54) MALEIMIDE-FUNCTIONAL MONOMERS IN AMORPHOUS FORM

(75) Inventor: Stephen M Dershem, San Diego, CA (US)

(73) Assignee: Designer Molecules Inc, Inc., San Diego, CA (US)

( * ) Notice: Subject to any disclaimer, the term of this patent is extended or adjusted under 35 U.S.C. 154(b) by 64 days.

(21) Appl. No.: 13/218,406

(22) Filed: Aug. 25, 2011

(65) Prior Publication Data

US 2012/0049106 A1 Mar. 1, 2012

Related U.S. Application Data

(60) Provisional application No. 61/377,066, filed on Aug. 25, 2010.

(51) Int. Cl.
*C07D 207/448* (2006.01)

(52) U.S. Cl.
USPC ............................ 548/520; 548/521; 548/522

(58) Field of Classification Search
USPC .......................................... 548/520, 521, 522
See application file for complete search history.

(56) References Cited

U.S. PATENT DOCUMENTS

| | | | | |
|---|---|---|---|---|
| 3,988,299 | A | * | 10/1976 | Malofsky ...................... 526/259 |
| 4,111,879 | A | | 9/1978 | Mori et al. |
| 4,623,696 | A | | 11/1986 | Mabrey et al. |
| 4,675,379 | A | | 6/1987 | Mikroyannidis et al. |
| 4,775,740 | A | | 10/1988 | Beggs et al. |
| 4,968,738 | A | | 11/1990 | Dershem |
| 5,013,804 | A | | 5/1991 | Kramer |
| 5,045,127 | A | | 9/1991 | Dershem et al. |
| 5,064,480 | A | | 11/1991 | Dershem et al. |
| 5,120,857 | A | * | 6/1992 | Kramer et al. ................. 548/435 |
| 5,232,962 | A | | 8/1993 | Dershem et al. |
| 5,306,333 | A | | 4/1994 | Dershem et al. |
| 5,358,992 | A | | 10/1994 | Dershem et al. |
| 5,403,389 | A | | 4/1995 | Dershem |
| 5,447,988 | A | | 9/1995 | Dershem et al. |
| 5,489,641 | A | | 2/1996 | Dershem |
| 5,646,241 | A | | 7/1997 | Dershem et al. |
| 5,717,034 | A | | 2/1998 | Dershem et al. |
| 5,718,941 | A | | 2/1998 | Dershem et al. |
| 5,753,748 | A | | 5/1998 | Dershem et al. |
| 5,861,111 | A | | 1/1999 | Dershem et al. |
| 5,969,036 | A | | 10/1999 | Dershem |
| 5,973,166 | A | | 10/1999 | Mizori et al. |
| 6,034,194 | A | | 3/2000 | Dershem |
| 6,034,195 | A | | 3/2000 | Dershem |
| 6,121,358 | A | | 9/2000 | Dershem et al. |
| 6,187,886 | B1 | | 2/2001 | Husson, Jr. et al. |
| 6,211,320 | B1 | | 4/2001 | Dershem et al. |
| 6,316,566 | B1 | | 11/2001 | Ma et al. |
| 6,355,750 | B1 | | 3/2002 | Herr |
| 6,423,780 | B1 | | 7/2002 | Dershem et al. |
| 6,429,281 | B1 | | 8/2002 | Dershem et al. |
| 6,521,731 | B2 | | 2/2003 | Dershem et al. |
| 6,620,946 | B2 | | 9/2003 | Dershem |
| 6,743,852 | B2 | | 6/2004 | Dershem et al. |
| 6,790,597 | B2 | | 9/2004 | Dershem |
| 6,825,245 | B2 | | 11/2004 | Dershem |
| 6,831,132 | B2 | | 12/2004 | Liu et al. |
| 6,852,814 | B2 | | 2/2005 | Dershem et al. |
| 6,916,856 | B2 | | 7/2005 | Dershem et al. |
| 6,946,523 | B2 | | 9/2005 | Dershem et al. |
| 6,960,636 | B2 | | 11/2005 | Dershem et al. |
| 6,963,001 | B2 | | 11/2005 | Dershem et al. |
| 7,102,015 | B2 | | 9/2006 | Dershem et al. |
| 7,157,587 | B2 | | 1/2007 | Mizori et al. |
| 7,176,044 | B2 | | 2/2007 | Forray et al. |
| 7,199,249 | B2 | | 4/2007 | Liu et al. |
| 7,208,566 | B2 | | 4/2007 | Mizori et al. |
| 7,285,613 | B2 | | 10/2007 | Dershem et al. |
| 7,309,724 | B2 | | 12/2007 | Dershem et al. |
| 7,517,925 | B2 | | 4/2009 | Dershem et al. |
| 7,678,879 | B2 | | 3/2010 | Dershem |
| 7,777,064 | B2 | | 8/2010 | Mizori |
| 7,786,234 | B2 | | 8/2010 | Dershem et al. |
| 7,786,248 | B2 | | 8/2010 | Dershem |
| 7,795,362 | B2 | | 9/2010 | Dershem |

(Continued)

FOREIGN PATENT DOCUMENTS

CN 1187507 7/1998
JP H10-505599 6/1998

(Continued)

OTHER PUBLICATIONS

Adamson, "Review of CSP and Flip Chip Underfill Processes and When to Use the Right Dispensing Tools for Efficient Manufacturing", Paper Presented at GlobalTRONICS Technology Conference,Singapore, 2002, pp. 1-6.

Andersson, et al., "Initiator-Free Photopolymerization of an Aliphatic Vinyl Ether-Maleimide Monomer", J Coatings Tech 69:91-95,1997.

Callais et al., "New Polymerization Technologies for Advanced Materials", Arkema, Inc. Presentation (King of Prussia, PA).Dec. 20, 2007.

(Continued)

*Primary Examiner* — Mark Eashoo
*Assistant Examiner* — Nicholas Hill
(74) *Attorney, Agent, or Firm* — The Law Office of Jane K. Babin, Professional Corporation; Jane K. Babin

(57) ABSTRACT

The present invention provides amorphous maleimide-bismaleimide hybrid mixtures and methods for synthesizing such mixtures by condensation of diamine compounds with maleic anhydride along with one or more additional anhydrides. The invention provides a route to get passed the high melting point and the solubility issues of bismaleimide resins, yet to still obtain the good thermo-mechanical properties of these valuable molecules.

17 Claims, No Drawings

(56) References Cited

U.S. PATENT DOCUMENTS

| | | |
|---|---|---|
| 7,868,113 B2 | 1/2011 | Dershem |
| 7,875,688 B2 | 1/2011 | Dershem et al. |
| 7,884,174 B2 | 2/2011 | Mizori et al. |
| 7,928,153 B2 | 4/2011 | Dershem |
| 8,008,419 B2 | 8/2011 | Dershem |
| 8,013,104 B2 | 9/2011 | Dershem |
| 8,039,663 B2 | 10/2011 | Dershem |
| 8,043,534 B2 | 10/2011 | Dershem |
| 2002/0007042 A1 | 1/2002 | Herr et al. |
| 2002/0062923 A1 | 5/2002 | Forray |
| 2002/0099168 A1 | 7/2002 | Dershem et al. |
| 2002/0188137 A1 | 12/2002 | Dershem et al. |
| 2002/0193541 A1 | 12/2002 | Dershem et al. |
| 2002/0198356 A1 | 12/2002 | Dershem et al. |
| 2003/0008992 A1 | 1/2003 | Dershem et al. |
| 2003/0055121 A1 | 3/2003 | Dershem et al. |
| 2003/0060531 A1 | 3/2003 | Dershem et al. |
| 2003/0087999 A1 | 5/2003 | Dershem et al. |
| 2003/0109666 A1 | 6/2003 | Dershem et al. |
| 2003/0125551 A1 | 7/2003 | Dershem et al. |
| 2003/0199638 A1 | 10/2003 | Liu et al. |
| 2003/0208016 A1 | 11/2003 | Dershem et al. |
| 2004/0019224 A1 | 1/2004 | Dershem et al. |
| 2004/0077798 A1 | 4/2004 | Dershem et al. |
| 2004/0082724 A1 | 4/2004 | Dershem et al. |
| 2004/0102566 A1 | 5/2004 | Forray et al. |
| 2004/0123948 A1 | 7/2004 | Dershem et al. |
| 2004/0225026 A1 | 11/2004 | Mizori et al. |
| 2004/0225045 A1 | 11/2004 | Forray |
| 2004/0225059 A1 | 11/2004 | Mizori et al. |
| 2005/0136620 A1 | 6/2005 | Dershem et al. |
| 2005/0137277 A1 | 6/2005 | Dershem et al. |
| 2005/0267254 A1 | 12/2005 | Mizori et al. |
| 2005/0272888 A1 | 12/2005 | Dershem et al. |
| 2006/0009578 A1 | 1/2006 | Dershem |
| 2006/0063014 A1 | 3/2006 | Forray |
| 2006/0069232 A1 | 3/2006 | Dershem et al. |
| 2006/0142517 A1 | 6/2006 | Dershem |
| 2007/0155869 A1 | 7/2007 | Dershem et al. |
| 2007/0205399 A1 | 9/2007 | Mizori |
| 2007/0299154 A1 | 12/2007 | Dershem et al. |
| 2008/0017308 A1 | 1/2008 | Dershem et al. |
| 2008/0075961 A1 | 3/2008 | Mizori |
| 2008/0075963 A1 | 3/2008 | Dershem |
| 2008/0075965 A1 | 3/2008 | Dershem |
| 2008/0103240 A1 | 5/2008 | Dershem |
| 2008/0142158 A1 | 6/2008 | Dershem |
| 2008/0146738 A1 | 6/2008 | Dershem |
| 2008/0160315 A1 | 7/2008 | Forray et al. |
| 2008/0191173 A1 | 8/2008 | Dershem et al. |
| 2008/0210375 A1 | 9/2008 | Dershem et al. |
| 2008/0251935 A1 | 10/2008 | Dersham |
| 2008/0257493 A1 | 10/2008 | Dershem |
| 2008/0262191 A1 | 10/2008 | Mizori |
| 2009/0061244 A1 | 3/2009 | Dershem |
| 2009/0215940 A1 | 8/2009 | Dershem |
| 2009/0288768 A1 | 11/2009 | Dershem |
| 2010/0041803 A1 | 2/2010 | Dershem |
| 2010/0041823 A1 | 2/2010 | Dershem |
| 2010/0041832 A1 | 2/2010 | Dershem |
| 2010/0041845 A1 | 2/2010 | Dershem et al. |
| 2010/0056671 A1 | 3/2010 | Dershem |
| 2010/0063184 A1 | 3/2010 | Dershem |
| 2010/0113643 A1 | 5/2010 | Dershem |
| 2010/0144977 A1 | 6/2010 | Dershem |
| 2010/0249276 A1 | 9/2010 | Dershem |
| 2011/0017400 A1 | 1/2011 | Dershem |
| 2011/0152466 A1 | 6/2011 | Dershem |

FOREIGN PATENT DOCUMENTS

| | | |
|---|---|---|
| WO | WO-9607691 | 3/1996 |
| WO | WO-2004099331 | 11/2004 |
| WO | WO-2005121190 | 12/2005 |
| WO | WO-2007100329 | 9/2007 |
| WO | WO-2008077140 | 6/2008 |
| WO | WO-2008077141 | 6/2008 |
| WO | WO-2008092168 | 7/2008 |
| WO | WO-2008124797 | 10/2008 |
| WO | WO-2008130894 | 11/2008 |
| WO | WO-2009117729 | 9/2009 |
| WO | WO-2010019832 | 2/2010 |

OTHER PUBLICATIONS

Grenier-Loustalot et al., "Monofunctional maleimide or acetylene terminated model compounds—I. Molten state homopolymerization reactivity and kinetics", European Polymer Journal 34:1705-1714, 1998.

Kohli et al., "Co-Polymerization of Maleimides and Vinyl Ethers: A Structural Study", Macromolecules 31:5681-5689, 1998.

Pyriadi et al., "Cyclopolyimerization of N-allylimaleimide Polymer", Polymer Preprints 11:60-65, 1970.

\* cited by examiner

MALEIMIDE-FUNCTIONAL MONOMERS IN AMORPHOUS FORM

RELATED APPLICATIONS

This application claims the benefit of priority under 35 USC §119 of U.S. Provisional Application Ser. No. 61/377,066, filed Aug. 25, 2010, the entire disclosure of which is incorporated herein by reference.

FIELD OF THE INVENTION

The present invention relates to maleimide (MI) and bismaleimide (BMI) functional monomers, compositions (e.g. adhesives and composite resins) containing the same, methods of preparation and uses therefor. In particular, the present invention relates to amorphous maleimide-functional monomers and mixtures thereof.

BACKGROUND

Maleimide (MI) and bismaleimide (BMI) functional compounds are useful monomers that have found applications in advanced composite resins and adhesives. They are generally noted for their ability to be polymerized to yield advanced performance resins that possess high glass transition temperatures, high modulus, and good heat resistance properties.

Despite the useful physical properties that can be achieved through the MI and BMI compounds as thermoset monomers, the handling properties of these materials is hampered by their tendency to exist as high melting, crystalline compounds. Only a small handful of BMI monomers are known that are liquid or amorphous at room temperature (see, for example, U.S. Pat. Nos. 3,951,902, 4,564,663 and 6,034,195). The inherent crystalline nature of the vast majority of MI and BMI compounds is a significant impediment against the broad use of these materials in liquid adhesive applications. They cannot be used as the base resin in any liquid adhesive formulation, and at best, can be used only as minor additives to the resin mixture. The use of MI and BMI compounds, even as additives, is further restricted in liquid adhesives to those that can be cured at temperatures greater than or equal to their melting points. Thus, solid MI and BMI compounds cannot generally be used in low temperature cure adhesives.

Some reduction in the melting points of this useful class of compounds can be achieved by melting together two or more of these monomers (see, for example, U.S. Patent Publication No. 20070155869). The value of this melting point suppression technique, however, is very limited since virtually all of the resulting melt blends will still freeze on cooling to yield polycrystalline solids that possess melting points that are well above room temperature. The crystalline MI and BMI compounds may also have poor solubility in other co-monomers. Thus, even if the co-monomers are liquids themselves, the MI and BMI monomers could generally only be added as a dispersion of fine solids in a liquid adhesive. This, in turn, would have a negative impact on the available loading level options for other desirable solid fillers (such as silica, which is often used to depress the CTE of the adhesive composition).

The crystalline properties of the MI and BMI compounds also present difficulties for the formulation of solid adhesives and matrix resins. The high melting points of these compounds, restricts their compatibility with other matrix resins. A physical dispersion of MI and/or BMI solids, for example, in an amorphous co-curative resin could never be as homogeneous as an MI or BMI dissolved in that same amorphous co-curative resin. A need therefore exists for maleimide and bismaleimide compounds that are non-crystalline at room temperature.

DETAILED DESCRIPTION

It is to be understood that both the foregoing general description and the following detailed description are exemplary and explanatory only and are not restrictive of the invention claimed. As used herein, the use of the singular includes the plural unless specifically stated otherwise. As used herein, "or" means "and/or" unless stated otherwise. Furthermore, use of the term "including" as well as other forms, such as "includes," and "included," is not limiting. The section headings used herein are for organizational purposes only and are not to be construed as limiting the subject matter described.

Unless specific definitions are provided, the nomenclatures utilized in connection with, and the laboratory procedures and techniques of analytical chemistry, synthetic organic and inorganic chemistry described herein are those known in the art, such as those set forth in "IUPAC Compendium of Chemical Terminology: IUPAC Recommendations (The Gold Book)" (McNaught ed.; International Union of Pure and Applied Chemistry, $2^{nd}$ Ed., 1997) and "Compendium of Polymer Terminology and Nomenclature: IUPAC Recommendations 2008" (Jones et al., eds; International Union of Pure and Applied Chemistry, 2009). Standard chemical symbols are used interchangeably with the full names represented by such symbols. Thus, for example, the terms "hydrogen" and "H" are understood to have identical meaning. Standard techniques may be used for chemical syntheses, chemical analyses, and formulation.

DEFINITIONS

"About" as used herein means that a number referred to as "about" comprises the recited number plus or minus 1-10% of that recited number. For example, "about" 100 degrees can mean 95-105 degrees or as few as 99-101 degrees depending on the situation. Whenever it appears herein, a numerical range such as "1 to 20" refers to each integer in the given range. A non-limiting example of such a range is "1 to 20 carbon atoms" in reference to alkyl, which means that an alkyl group can contain only 1 carbon atom, 2 carbon atoms, 3 carbon atoms, etc., up to and including 20 carbon atoms (although the term "alkyl", which is defined further below, also includes instances where no numerical range of carbon atoms is designated).

"Adhesive" or "adhesive compound" or "adhesive formulation" as used herein, refers to any substance that can adhere or bond two items together. Implicit in the definition of an "adhesive composition" or "adhesive formulation" is the fact that the composition or formulation is a combination or mixture of more than one species, component or compound, which can include adhesive monomers, oligomers, and/or polymers along with other materials, whereas an "adhesive compound" refers to a single species, such as an adhesive polymer or oligomer.

"Adhesive composition" as used herein, refers to un-cured mixtures in which the individual components in the mixture retain the chemical and physical characteristics of the original individual components of which the mixture is made. Adhesive compositions are typically malleable and may be liquids, pastes, gels or other forms that can be applied to an item so that it can be bonded to another item.

"Mixture" or "blend" as used herein, refers to a physical or mechanical aggregation or a combination of two or more individual, chemically distinct compounds or substances that are not chemically united and do not exist in fixed proportions to each other.

"Cured adhesive," "cured adhesive composition" or "cured adhesive compound" refers to adhesives components and mixtures obtained from reactive curable original compound(s) or mixture(s) thereof, which have undergone a chemical and/or physical changes such that the original compound(s) or mixture(s) is (are) transformed into a solid, substantially non-flowing material. A typical curing process may involve crosslinking.

"Curable" means that an original compound(s) or composition material(s) can be transformed into a solid, substantially non-flowing material by means of chemical reaction, crosslinking, radiation crosslinking, or the like. Thus, adhesive compositions of the invention are curable, but unless otherwise specified, the original compound(s) or composition material(s) is (are) not cured.

"Thermoplastic," as used herein, refers to the ability of a compound, composition or other material (e.g. a plastic) to dissolve in a suitable solvent or to melt to a liquid when heated and to freeze to a solid, often brittle and glassy, state when cooled sufficiently.

"Thermoset," as used herein, refers to the ability of a compound, composition or other material to irreversibly "cure" resulting in a single tridimensional network that has greater strength and less solubility compared to the non-cured product. Thermoset materials are typically polymers that may be cured, for example, through heat (e.g. above 200° Celsius), via a chemical reaction (e.g. epoxy ring-opening, free-radical polymerization, etc.), or through irradiation (e.g. visible light, U.V., or X-ray irradiation).

Thermoset materials, such as thermoset polymers or resins, are typically liquid or malleable forms prior to curing, and therefore may be molded or shaped into their final form, and/or used as adhesives. Curing transforms the thermoset resin into a rigid infusible and insoluble solid or rubber by a cross-linking process. Thus, energy and/or catalysts are typically added that cause the molecular chains to react at chemically active sites (unsaturated or epoxy sites, for example), linking the polymer chains into a relatively rigid 3-D structure. The cross-linking process forms molecules with a higher molecular weight and resultant higher melting point. During the reaction, when the molecular weight of the polymer has increased to a point such that the melting point is higher than the surrounding ambient temperature, the polymer becomes a solid material.

"Cross-linking," as used herein, refers to the attachment of two or more oligomer or longer polymer chains by bridges of an element, a molecular group, a compound, or another oligomer or polymer. Crosslinking may take place upon heating; some crosslinking processes may also occur at room temperature or a lower temperature. As cross-linking density is increased, the properties of a material can be changed from thermoplastic to thermosetting.

As used herein, "B-stageable" refers to the properties of an adhesive having a first solid phase followed by a tacky rubbery stage at elevated temperature, followed by yet another solid phase at an even higher temperature. The transition from the tacky rubbery stage to the second solid phase is referred to a "thermosetting." However, prior to thermosetting, the material behaves similarly to a thermoplastic material. Thus, such adhesives allow for low lamination temperatures while providing high thermal stability.

A "die" or "semiconductor die" as used herein, refers to a small block of semiconducting material, on which a functional circuit is fabricated.

A "flip-chip" semiconductor device is one in which a semiconductor die is directly mounted to a wiring substrate, such as a ceramic or an organic printed circuit board. Conductive terminals on the semiconductor die, usually in the form of solder bumps, are directly physically and electrically connected to the wiring pattern on the substrate without use of wire bonds, tape-automated bonding (TAB), or the like. Because the conductive solder bumps making connections to the substrate are on the active surface of the die or chip, the die is mounted in a face-down manner, thus the name "flip-chip."

"Underfill," "underfill composition" and "underfill material" are used interchangeably to refer to materials, typically polymeric compositions, used to fill gaps between a semiconductor component, such as a semiconductor die, and a substrate. "Underfilling" refers to the process of applying an underfill composition to a semiconductor component-substrate interface, thereby filling the gaps between the component and the substrate.

The term "monomer" refers to a molecule that can undergo polymerization or copolymerization, thereby contributing constitutional units to the essential structure of a macromolecule (a polymer).

"Polymer" and "polymer compound" are used interchangeably herein, to refer generally to the combined products of a single chemical polymerization reaction. Polymers are produced by combining monomer subunits into a covalently bonded chain. Polymers that contain only a single type of monomer are known as "homopolymers," while polymers containing a mixture of monomers are known as "copolymers."

Unless a more restrictive term is used, polymer is intended to encompass homopolymers, and copolymers having any arrangement of monomer subunits as well as copolymers containing individual molecules having more than one arrangement. With respect to length, unless otherwise indicated, any length limitations recited for the polymers described herein are to be considered averages of the lengths of the individual molecules in a polymer compound or composition.

As used herein, "oligomer" or "oligomeric" refers to a polymer having a finite and moderate number of repeating monomers structural units. Oligomers of the invention typically have 2 to about 100 repeating monomer units; frequently 2 to about 30 repeating monomer units; and often 2 to about 10 repeating monomer units; and usually have a molecular weight up to about 3,000.

The skilled artisan will appreciate that oligomers and polymers may, depending on the availability of polymerizable groups or side chains, subsequently be incorporated as monomers in further polymerization or crosslinking reactions.

As used herein, "aliphatic" refers to any alkyl, alkenyl, cycloalkyl, or cycloalkenyl moiety.

"Aromatic hydrocarbon" or "aromatic" as used herein, refers to compounds having one or more benzene rings.

"Alkane," as used herein, refers to saturated straight-chain, branched or cyclic hydrocarbons having only single bonds. Alkanes have general formula $C_nH_{2n+2}$.

"Cycloalkane" refers to an alkane having one or more rings in its structure.

As used herein, "alkyl" refers to straight or branched chain hydrocarbyl groups having from 1 up to about 500 carbon atoms. "Lower alkyl" refers generally to alkyl groups having 1 to 6 carbon atoms. The terms "alkyl" and "substituted alkyl" include, respectively, substituted and unsubstituted $C_1$-$C_{500}$ straight chain saturated aliphatic hydrocarbon groups, substituted and unsubstituted $C_2$-$C_{200}$ straight chain unsaturated aliphatic hydrocarbon groups, substituted and unsubstituted $C_4$-$C_{100}$ branched saturated aliphatic hydrocarbon groups, substituted and unsubstituted $C_1$-$C_{500}$ branched unsaturated aliphatic hydrocarbon groups.

For example, the definition of "alkyl" includes but is not limited to: methyl (Me), ethyl (Et), propyl (Pr), butyl (Bu), pentyl, hexyl, heptyl, octyl, nonyl, decyl, undecyl, ethenyl, propenyl, butenyl, penentyl, hexenyl, heptenyl, octenyl, nonenyl, decenyl, undecenyl, isopropyl (i-Pr), isobutyl (i-Bu), tert-butyl (t-Bu), sec-butyl (s-Bu), isopentyl, neopentyl, cyclopropyl, cyclobutyl, cyclopentyl, cyclohexyl, cycloheptyl, cyclooctyl, cyclopentenyl, cyclohexenyl, cycloheptenyl, cyclooctenyl, methylcyclopropyl, ethylcyclohexenyl, butenylcyclopentyl, tricyclodecyl, adamantyl, norbornyl and the like.

"Substituted alkyl" refers to alkyl moieties bearing substituents that include but are not limited to alkyl, alkenyl, alkynyl, hydroxy, oxo, alkoxy, mercapto, cycloalkyl, substituted cycloalkyl, heterocyclic, substituted heterocyclic, aryl, substituted aryl (e.g., aryl$C_{1-10}$alkyl or aryl$C_{1-10}$alkyloxy), heteroaryl, substituted heteroaryl (e.g., heteroaryl$C_{1-10}$alkyl), aryloxy, substituted aryloxy, halogen, haloalkyl (e.g., trihalomethyl), cyano, nitro, nitrone, amino, amido, carbamoyl, =O, =CH—, —C(O)H, —C(O)O—, —C(O)—, —S—, —S(O)$_2$—, —OC(O)—O—, —NR—C(O)—, —NR—C(O)—NR—, —OC(O)—NR—, where R is H or lower alkyl, acyl, oxyacyl, carboxyl, carbamate, sulfonyl, sulfonamide, sulfuryl, $C_{1-10}$alkylthio, aryl$C_{1-10}$alkylthio, $C_{1-10}$alkylamino, aryl$C_{1-10}$alkylamino, N-aryl-N—$C_{1-10}$alkylamino, $C_{1-10}$alkyl carbonyl, aryl$C_{1-10}$allsylcarbonyl, $C_{1-10}$alkylcarboxy, aryl $C_{1-10}$alkylcarboxy, $C_{1-10}$alkyl carbonylamino, aryl $C_{1-10}$alkylcarbonylamino, tetrahydrofuryl, morpholinyl, piperazinyl, and hydroxypyronyl.

As used herein, "cycloalkyl" refers to cyclic ring-containing groups containing in the range of about 3 up to about 20 carbon atoms, typically 3 to about 15 carbon atoms. In certain embodiments, cycloalkyl groups have in the range of about 4 up to about 12 carbon atoms, and in yet further embodiments, cycloalkyl groups have in the range of about 5 up to about 8 carbon atoms and "substituted cycloalkyl" refers to cycloalkyl groups further bearing one or more substituents as set forth below.

As used herein, the term "aryl" represents an unsubstituted, mono-, di- or trisubstituted monocyclic, polycyclic, biaryl aromatic groups covalently attached at any ring position capable of forming a stable covalent bond, certain preferred points of attachment being apparent to those skilled in the art (e.g., 3-phenyl, 4-naphtyl and the like). The aryl substituents are independently selected from the group consisting of halo, —OH, —SH, —CN, —NO$_2$, trihalomethyl, hydroxypyronyl, $C_{1-10}$alkyl, aryl$C_{1-10}$alkyl, $C_{1-10}$alkyloxy$C_{1-10}$alkyl, aryl$C_{1-10}$alkyloxy$C_{1-10}$alkyl, $C_{1-10}$alkylthio$C_{1-10}$alkyl, aryl$C_{1-10}$alkylthio$C_{1-10}$alkyl, $C_{1-10}$alkylamino$C_{1-10}$alkyl, aryl$C_{1-10}$alkylamino$C_{1-10}$alkyl, N-aryl-N—$C_{1-10}$alkylamino$C_{1-10}$alkyl, $C_{1-10}$alkylcarbonyl$C_{1-10}$alkyl, aryl $C_{1-10}$alkylcarbonyl $C_{1-10}$alkyl, $C_{1-10}$alkylcarboxy$C_{1-10}$alkyl, aryl$C_{1-10}$alkylcarboxy$C_{1-10}$alkyl, $C_{1-10}$alkylcarbonylamino$C_{1-10}$alkyl, and aryl$C_{1-10}$alkylcarbonylamino$C_{1-10}$alkyl.

Some specific examples of moieties encompassed by the definition of "aryl" include but are not limited to phenyl, biphenyl, naphthyl, dihydronaphthyl, tetrahydronaphthyl, indenyl, indanyl, azulenyl, anthryl, phenanthryl, fluorenyl, pyrenyl and the like. "Substituted aryl" refers to aryl groups further bearing one or more substituents as set forth below.

As used herein, "arylene" refers to a divalent aryl moiety. "Substituted arylene" refers to arylene moieties bearing one or more substituents as set forth above.

As used herein, "alkylaryl" refers to alkyl-substituted aryl groups and "substituted alkylaryl" refers to alkylaryl groups further bearing one or more substituents as set forth below.

As used herein, "arylalkyl" refers to aryl-substituted alkyl groups and "substituted arylalkyl" refers to arylalkyl groups further bearing one or more substituents as set forth below. Some examples of included but are not limited to (4-hydroxyphenyl)ethyl, or (2-aminonaphthyl)hexenyl.

As used herein, "arylalkenyl" refers to aryl-substituted alkenyl groups and "substituted arylalkenyl" refers to arylalkenyl groups further bearing one or more substituents as set forth below.

As used herein, "arylalkynyl" refers to aryl-substituted alkynyl groups and "substituted arylalkynyl" refers to arylalkynyl groups further bearing one or more substituents as set forth below.

As used herein, "alkenyl," "alkene" or "olefin" refers to straight or branched chain unsaturated hydrocarbyl groups having at least one carbon-carbon double bond, and having in the range of about 2 up to 500 carbon atoms. In certain embodiments, alkenyl groups have in the range of about 5 up to about 250 carbon atoms, 5 up to about 100 carbon atoms, 5 up to about 50 carbon atoms or 5 up to about 25 carbon atoms. In other embodiments, alkenyl groups have in the range of about 6 up to about 500 carbon atoms, 8 up to about 500 carbon atoms, 10 up to about 500 carbon atoms or 20 up to about 500 carbon atoms or 50 up to about 500 carbon atoms. In yet further embodiments, alkenyl groups have in the range of about 6 up to about 100 carbon atoms, 10 up to about 100 carbon atoms, 20 up to about 100 carbon atoms or 50 up to about 100 carbon atoms, while in other embodiments, alkenyl groups have in the range of about 6 up to about 50 carbon atoms, 6 up to about 25 carbon atoms, 10 up to about 50 carbon atoms, or 10 up to about 25 carbon atoms. "Substituted alkenyl" refers to alkenyl groups further bearing one or more substituents as set forth above.

As used herein, "alkylene" refers to a divalent alkyl moiety, and "substituted alkylene" refers to alkylene groups further bearing one or more substituents set forth above.

"Maleimide" or "MI," as used herein, refers to an N-substituted maleimide having the formula as shown below:

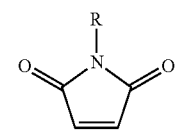

where R is an aromatic, heteroaromatic, aliphatic, or polymeric moiety.

"Bismaleimide" or "BMI", as used herein, refers to compound in which two imide moieties are linked by a bridge, i.e. a compound a polyimide having the general structure shown below:

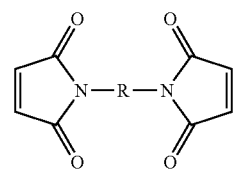

where R is an aromatic, heteroaromatic, aliphatic, or polymeric moiety.

BMIs can cure through an addition rather than a condensation reaction, thus avoiding problems resulting from the formation of volatiles. BMIs can be cured by a vinyl-type polymerization of a pre-polymer terminated with two maleimide groups.

As used herein, "norbornyl" refers to a compound bearing at least one moiety having the structure:

As used herein, the term "free radical initiator" refers to any chemical species which, upon exposure to sufficient energy (e.g., light, heat, or the like), decomposes into parts which are uncharged, but every one of such part possesses at least one unpaired electron.

As used herein, the term "coupling agent" refers to chemical species that are capable of bonding to a mineral surface and which also contain polymerizably reactive functional group(s) so as to enable interaction with the adhesive composition. Coupling agents thus facilitate linkage of the die-attach paste to the substrate to which it is applied.

The term "solvent," as used herein, refers to a liquid that dissolves a solid, liquid, or gaseous solute, resulting in a solution. "Co-solvent" refers to a second, third, etc. solvent used with a primary solvent.

As used herein, "polar protic solvents" are ones that contains an O—H or N—H bond, while "polar aprotic solvents" do not contain an O—H or N—H bond.

The term "amorphous," as used herein, refers to a non-crystalline solid in which the atoms and molecules are not organized in a definite lattice pattern.

The term "crystalline," as used herein, refers to a structure in which the constituent molecules are arranged in a regularly ordered, repeating pattern.

"Glass transition temperature" or "$T_g$" is used herein to refer to the temperature at which an amorphous solid, such as a polymer, becomes brittle on cooling, or soft on heating. More specifically, it defines a pseudo second order phase transition in which a supercooled melt yields, on cooling, a glassy structure and properties similar to those of crystalline materials e.g. of an isotropic solid material.

"Modulus" or "Young's modulus" as used herein, is a measure of the stiffness of a material. Within the limits of elasticity, modulus is the ratio of the linear stress to the linear strain, which can be determined from the slope of a stress-strain curve created during tensile testing.

The "Coefficient of Thermal Expansion" or "CTE" is a term of art describing a thermodynamic property of a substance. The CTE relates a change in temperature to the change in a material's linear dimensions. As used herein "$\alpha_1$ CTE" or "$\alpha_1$" refers to the CTE before the $T_g$, while "$\alpha_2$ CTE" refers to the CTE after the $T_g$.

"Thixotropy" as used herein, refers to the property of a material which enables it to stiffen or thicken in a relatively short time upon standing, but upon agitation or manipulation to change to low-viscosity fluid; the longer the fluid undergoes shear stress, the lower its viscosity. Thixotropic materials are therefore gel-like at rest but fluid when agitated and have high static shear strength and low dynamic shear strength, at the same time.

"Thermogravimetric analysis" or "TGA" refers to a method of testing and analyzing a material to determine changes in weight of a sample that is being heated in relation to change in temperature. "Decomposition onset" refers to a temperature when the loss of weight in response to the increase of the temperature indicates that the sample is beginning to degrade.

According to the embodiments of the invention, amorphous MI-BMI hybrid mixtures can be prepared using a single-pot method that is described in more detail below. These compound mixtures retain virtually all of the desirable properties of bismaleimides, but without the solubility and compatibility limitations of MI and BMI compounds noted above.

According to the embodiments of the invention, MI-BMI hybrid compound mixtures can be prepared, the compound mixtures comprising:

(1) at least one compound of type A, as shown below

and;

(2a) at least one compound of type B, or
(2b) at least one compound of type C, or
(2c) at least one compound of type B and at least one compound of type C, as shown below

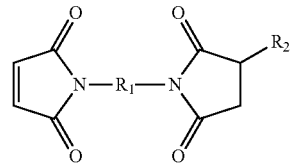

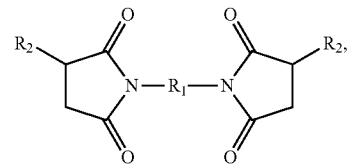

wherein $R_1$ is an unsubstituted or substituted aromatic, an unsubstituted or substituted aliphatic or an unsubstituted or substituted cycloaliphatic moiety comprising between 2 and about 500 carbon atoms; and $R_2$ is an unsubstituted or substituted alkylene or cycloakylene moiety comprising between 3 and about 36 carbon atoms, wherein the cycloalkylene moiety taken together with the maleimide structure to which it is attached can form a condensed ring structure.

According to the embodiments of the invention, the equivalent percent of maleimide functionality in the above-described mixtures at issue is typically between about 50% and about 95% based on the total imide content. Frequently, the equivalent percent of maleimide functionality is between about 60 and about 90% based on the total imide content. Most often, the equivalent percent of maleimide functionality is between about 65% and about 85% based on the total imide content.

Stated differently, according to the embodiments of the invention, the total contents of monomers A and B shown above is at least 90 mole % of the total mixture, such as 95 mole % of the total mixture, for example, at least 97% of the total mixture. Monomer C shown above, thus, represents the balance, i.e., up to 10 mole %, up to 5 mole % or up to 3 mole %, respectively.

Various methods may be used to prepare the above-described mixtures. In some embodiments, the compound mixtures of the invention are prepared by the ring closing, imide forming condensation reaction of a diamine with maleic anhydride along with a certain percentage of one additional anhydride. Example of the diamines contemplated for use in the current invention include, but are not limited to, 1,3-cyclohexanebis(methylamine), 1,5-diamino-2-methylpentane, 1,9-diaminononane, 2,2'-(ethylenedioxy)bis(ethylamine), 2,2-dimethyl-1,3-propanediamine, 2,3,5,6-tetramethyl-p-phenylenediamine, 2,4,6-trimethyl-m-phenylenediamine, 2,4,8,10-tetraoxaspiro[5.5]undecane, 3,9-dipropanamine, 2,4-diaminotoluene, 2,5-dimethyl-1,4-phenylenediamine, 2,5-dichloro-p-phenylenediamine, 2,6-diaminotoluene, 3,3'-methylenedianilline, 3,4'-oxydianiline, 3,4-diaminobenzophenone, 4,4'-(1,1'-biphenyl-4,4'-diyldioxy)dianiline, 4,4'-(1,3-phenylenediisopropylidene)bisaniline, 4,4'-(1,3-phenylenedioxy)dianiline, 4,4'-(1,4-phenylenediisopropylidene)bisaniline, 4,4'-(4,4'-isopropylidenediphenyl-1,1'-diyldioxy)dianiline, 4,4'-(hexafluoroisopropylidene)bis(p-phenyleneoxy)dianiline, 4,4'-(hexafluoroisopropylidene)dianiline), 3,3'-(hexafluoroisopropylidene)dianiline, 4,4'-diaminobenzanilide, 4,4'-diaminobenzophenone, 4,4'-diaminooctafluorobiphenyl, 4,4'-methylene-bis(2-chloroaniline), 4,4'-methylenebis(2,6-diethylaniline), 4,4'-methylenebis(2,6-dimethylaniline), 4,4'-methylenebis(cyclohexylamine), 4-chloro-o-phenylenediamine, 5,5'-(hexafluoroisopropylidene)di-o-toluidine, 1-ethyl-1,3-propanediamine, p-xylylenediamine, 1,2-diaminopropane, 1,2-cyclopentane diamine, 1,2-diaminocyclohexane, 1,3-di(aminomethyl)cyclohexane, 1,4-di(aminomethyl)cyclohexane, 2,2-bis(3-amino-4-methylphenyl)hexafluoropropane, 1,4-bis(4-aminophenoxy)benzene, 1,3-bis(3-aminophenoxy)benzene, 4,4'-bis(4-aminophenoxy)biphenyl, 2,2-bis[4-(4-aminophenoxy)phenyl] hexafluoropropane, 2,2-bis[4-(4-aminophenoxy)phenyl]propane, bis[4-(3-aminophenoxy)phenyl]sulfone, bis[4-(4-aminophenoxy)phenyl]sulfone, 1,1-bis(4-aminophenyl) cyclohexane, 9,9-bis(4-aminophenyl)fluorene, bis(2-aminophenyl)sulfide, bis(4-aminophenyl)sulfide, bis(3-aminophenyl)sulfone, bis(4-aminophenyl)sulfone, 2,2'-bis(trifluoromethyl)benzidine, 4,4'-diaminobenzophenone, 3,3'-diaminobenzophenone, 4,4'-diamino-3,3'-dimethyldiphenylmethane, 3,3'-diaminodiphenyl ether, 4,4'-diaminodiphenyl ether, 3,3'-diaminodiphenylmethane, 3,4'-diaminodiphenylmethane, 4,4'-diaminodiphenylmethane, 2,7-diaminofluorene, 1,5-diaminonaphthalene, 4,4'-diaminooctafluorobiphenyl, 2,5-dimethyl-1,4-phenylenediamine, 4,4'-ethylenedianiline, 4,4'-methylenebis(cyclohexylamine), 4,4'-methylenebis(2-ethyl-6-methylaniline), 4,4'-methylenebis(2-methylcyclohexylamine), 1,3-phenylenediamine, 1,4-phenylenediamine, 1tricyclodecanediamine, isophoronediamine, 2-methyl-3,3-dimethyl-1,6-hexanediamine, 3-2,3,5,6-tetramethyl-1,4-phenylenediamine, (aminomethyl)aniline and the like. It is understood that those skilled in the art can find many diamines and polyamines in various chemical catalogs.

As mentioned above, in addition to maleic anhydride, a certain amount of an additional anhydride is also used. Examples of such additional anhydrides that are contemplated for use in the invention include, but are not limited to, (2-dodecene-1-yl)succinic anhydride, 2-octene-1-ylsuccinic anhydride, 1,2,3,6-tetrahydrophthalic anhydride, 3,4,5,6-tetrahydrophthalic anhydride, dodecenylsuccinic anhydride, hexahydro-4-methylphthalic anhydride, bicyclo[2.2.2]oct-5-ene-2,3-dicarboxylic anhydride, 1,2-cyclohexanedicarboxylic anhydride, bicyclo[2.2.1]hept-5-ene-2,5-norbornene-2,3-dicarboxylic anhydride, methyl-5-norbornene-2,3-dicarboxylic anhydride, 2-octadecenylsuccinic anhydride, allylsuccinic anhydride and the like. It is understood to those skilled in the art that many of the succinic anhydride derivatives contemplated for use in the invention may be mixtures of straight chained and/or branched isomers.

Examples of monomers of type A that can be used include, but are not limited to, any of the following:

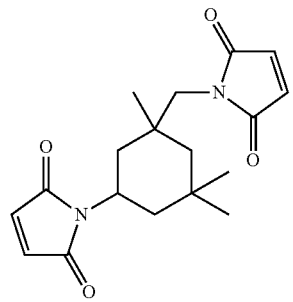

Compound 1a

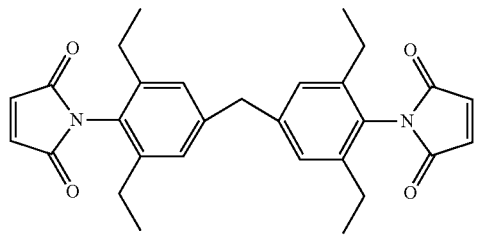

Compound 2a

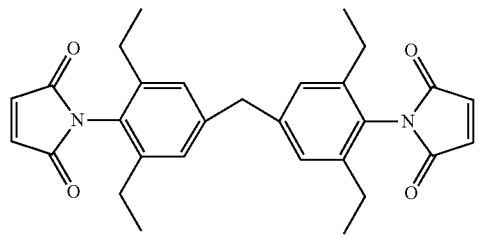

Compound 3a

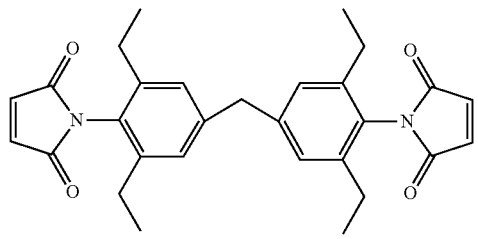

Compound 4a

-continued
Compound 5a
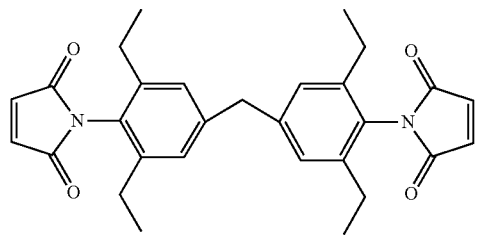
Compound 6a
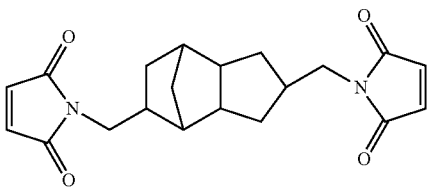
Compound 7a
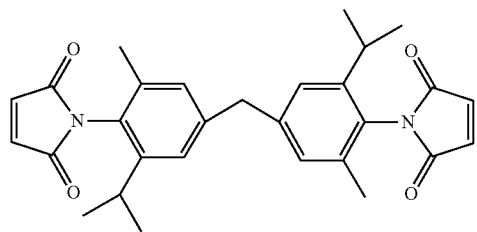
Compound 8a
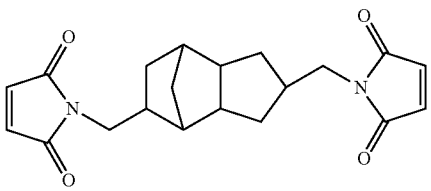
Compound 9a
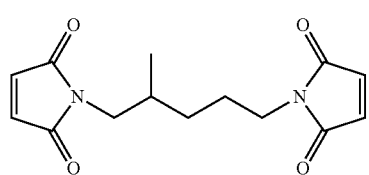
Compound 10a
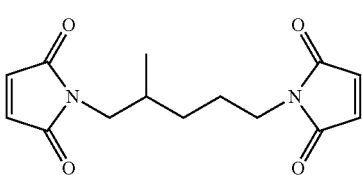
Compound 11a
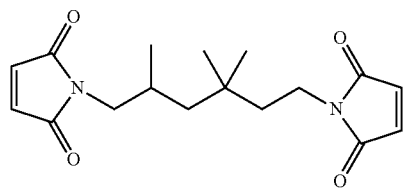
Compound 12a
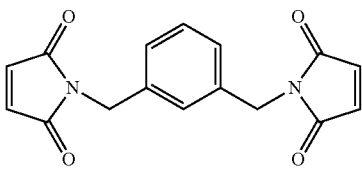
Compound 13a
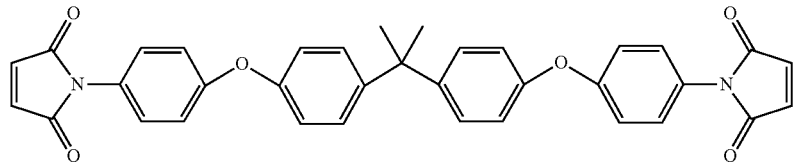
Compound 14a
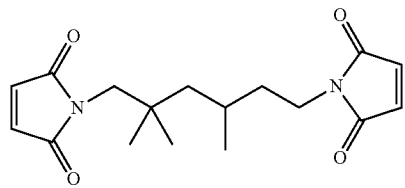
Compound 15a
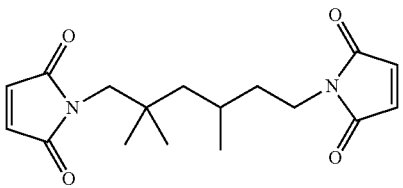
Compound 16a
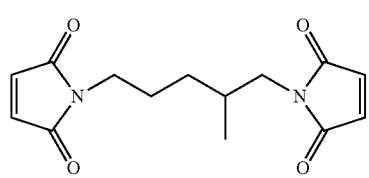
Compound 17a
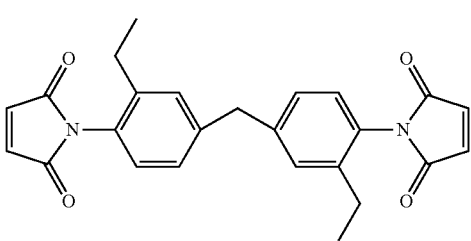

Examples of monomers of type B and/or C that can be used include, but are not limited to, any of the following:
Compound 1b
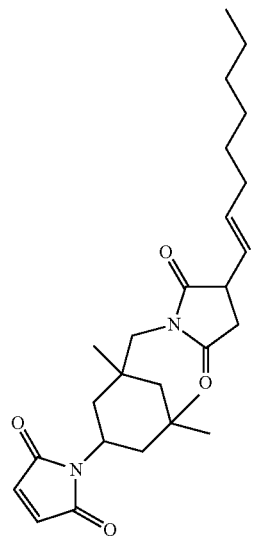
Compound 2b
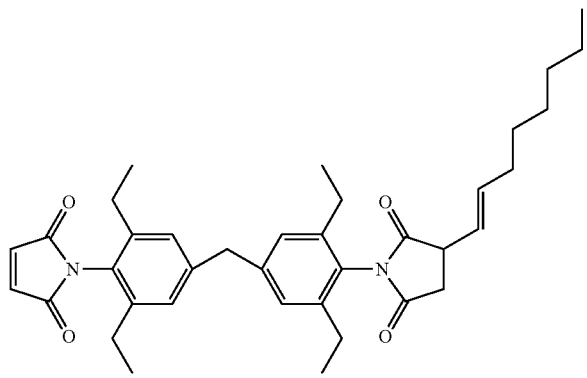
Compound 3b
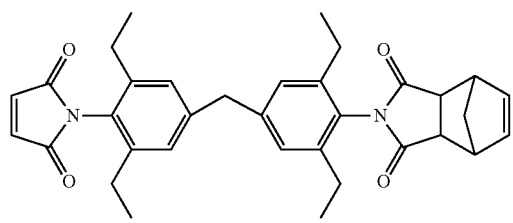
Compound 3c
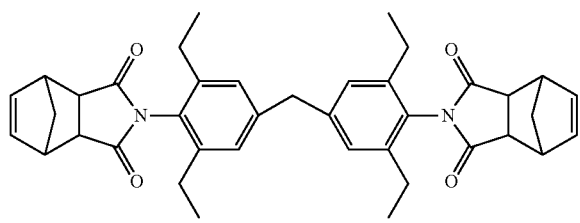
Compound 4b
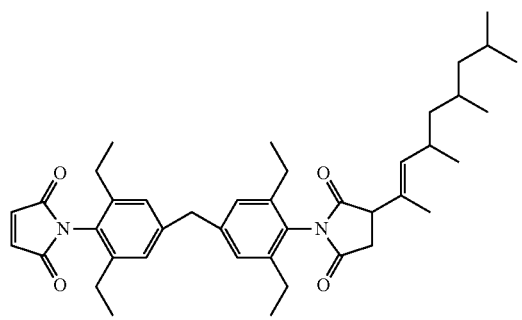
Compound 5b
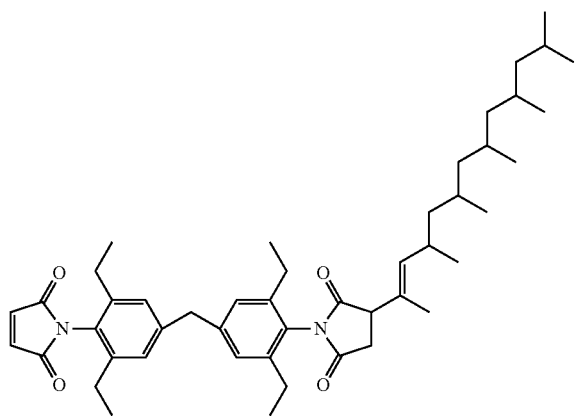

-continued
Compound 6b
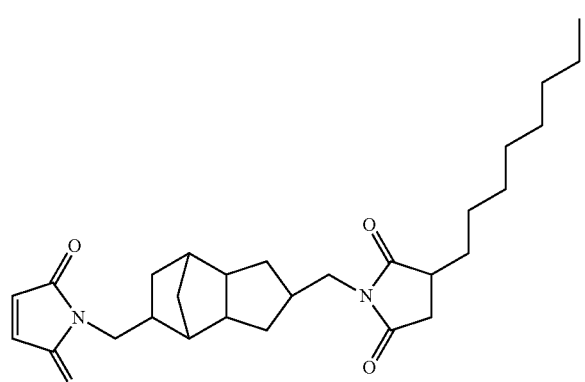
Compound 7b
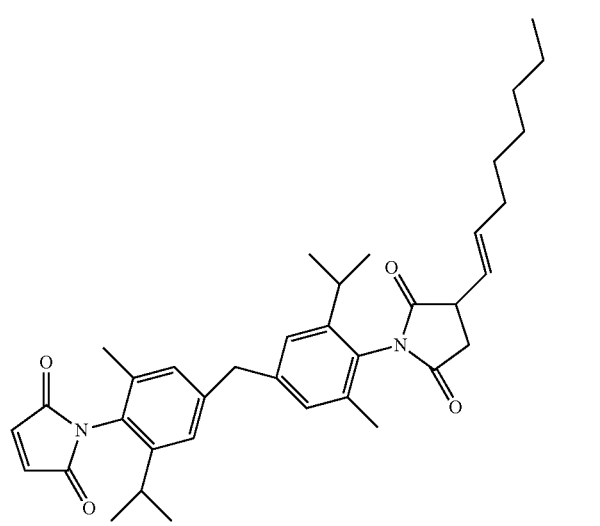
Compound 8b
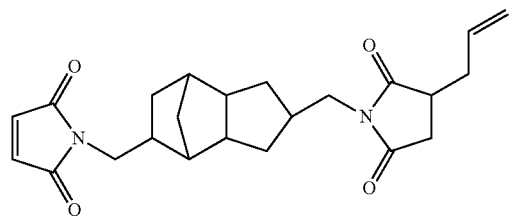
Compound 9b
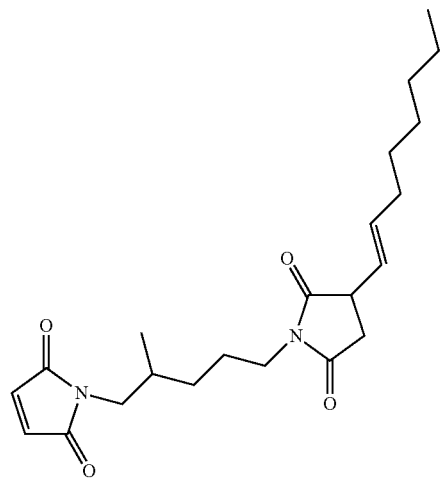
Compound 10b
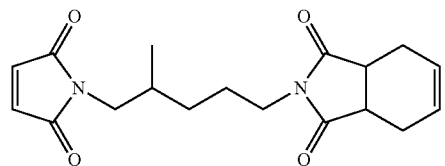
Compound 11b
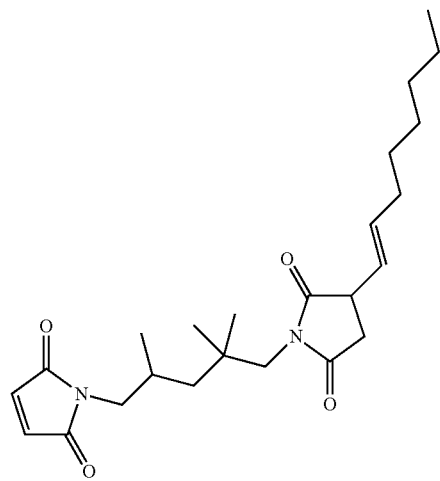

Compound 12b
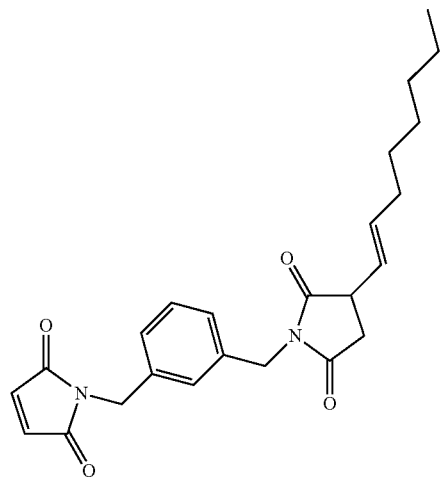
Compound 13b
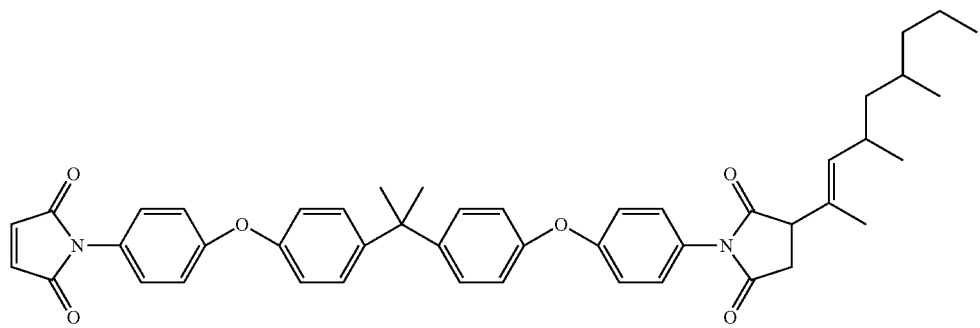
Compound 14b
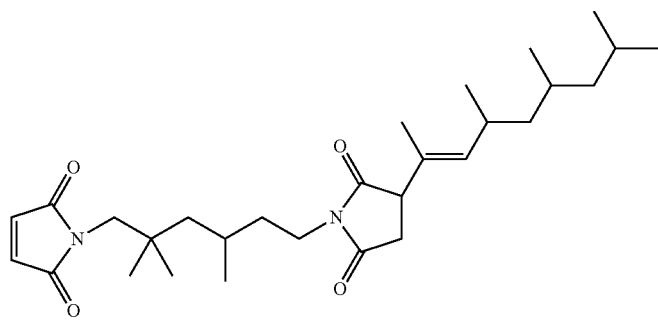
Compound 15b
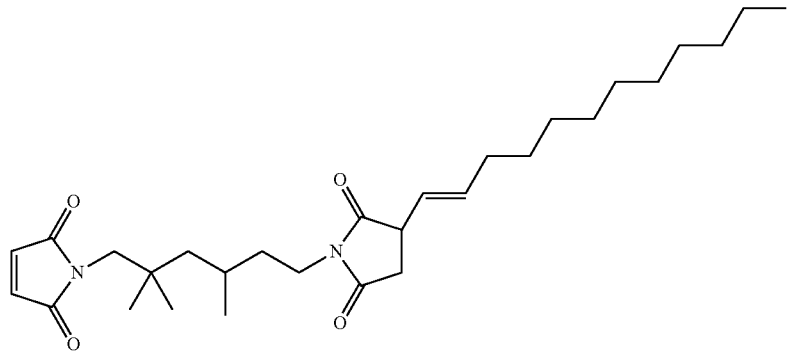

-continued
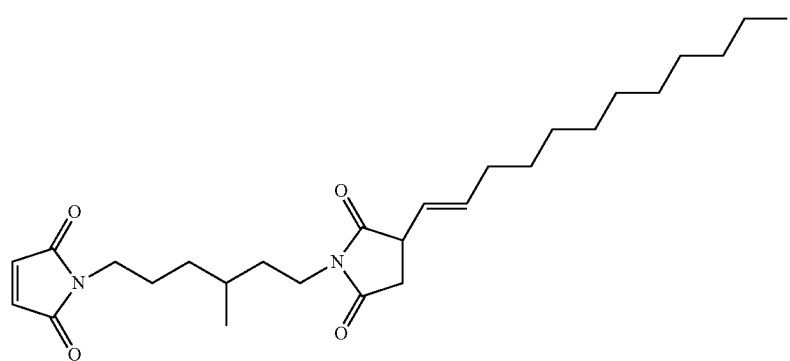
Compound 16b
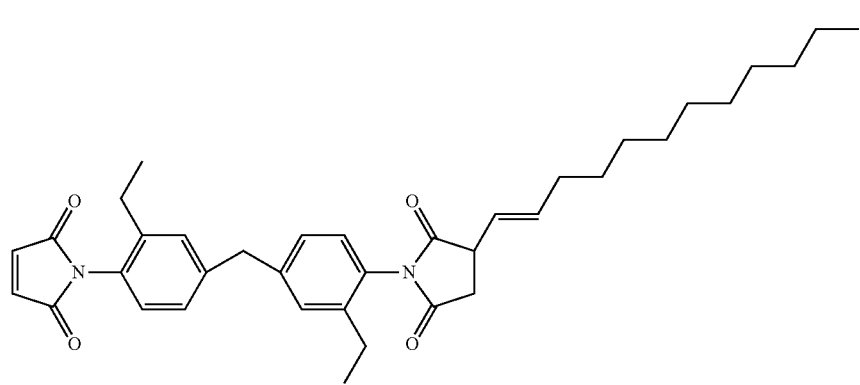
Compound 17b
Using monomers of types A, B and/or C shown above, any of the following exemplary mixtures may be prepared according to the embodiments of the invention:
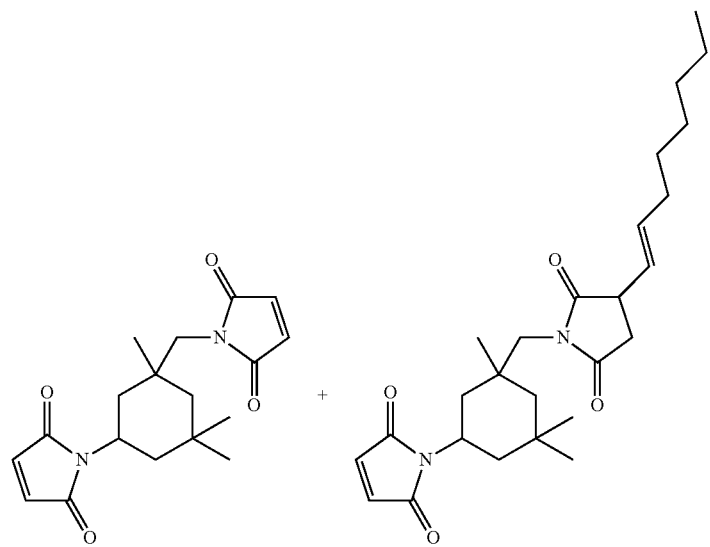
Compound 1a     Compound 1b

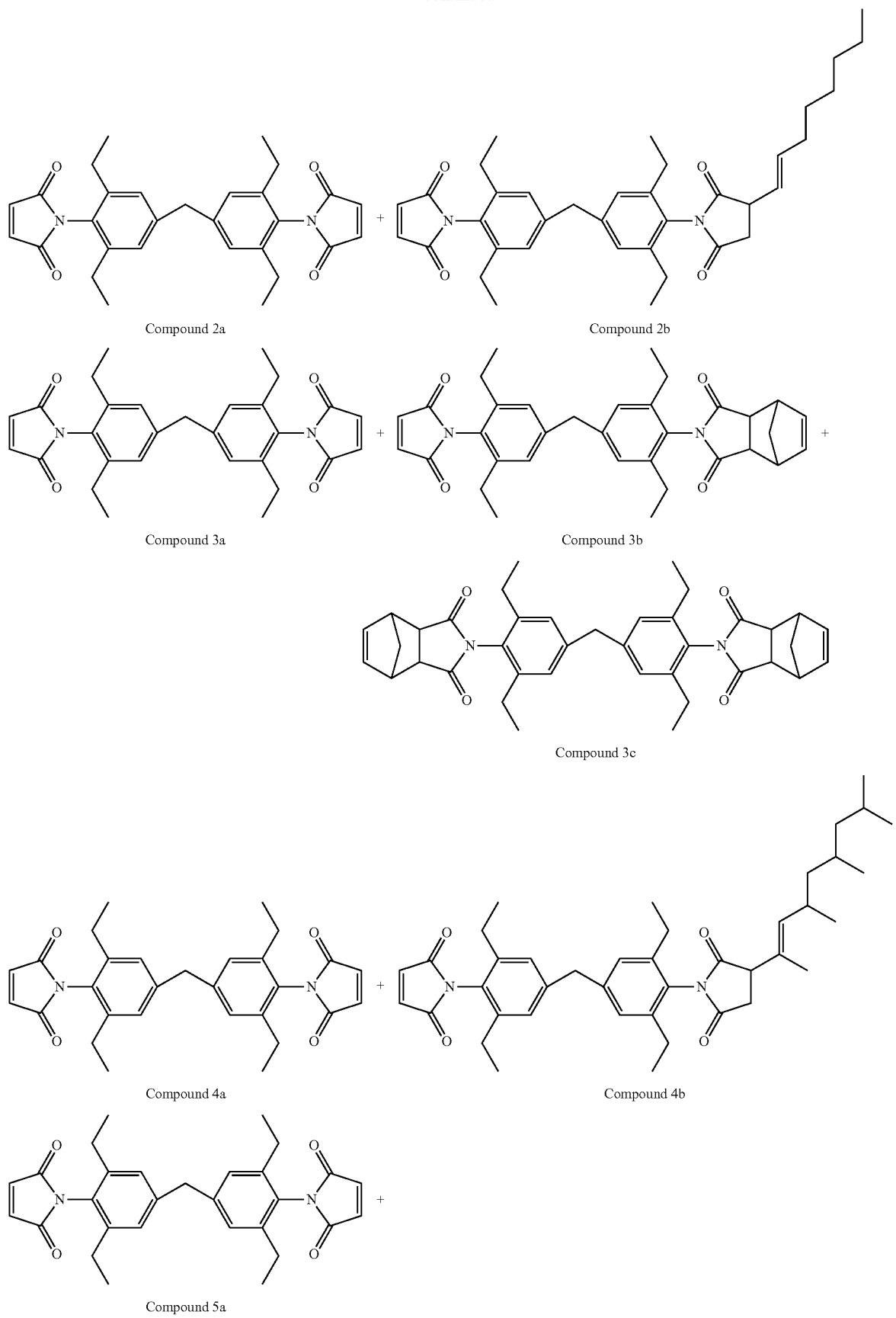

-continued
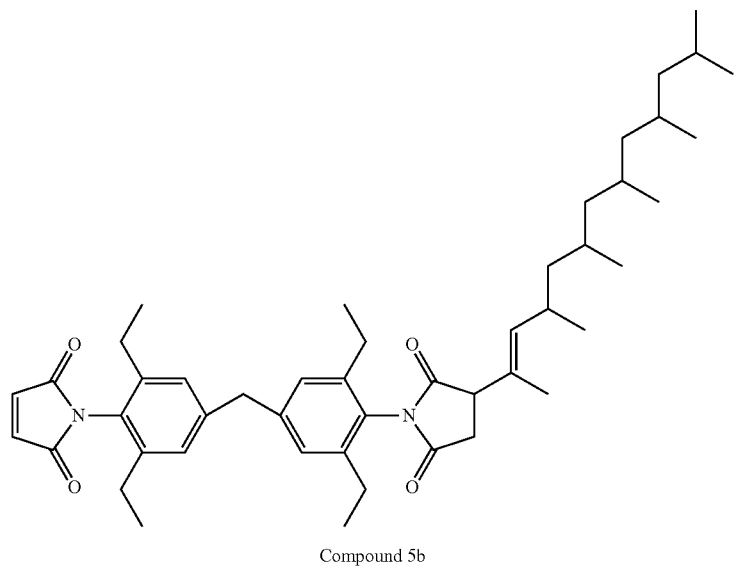
Compound 5b
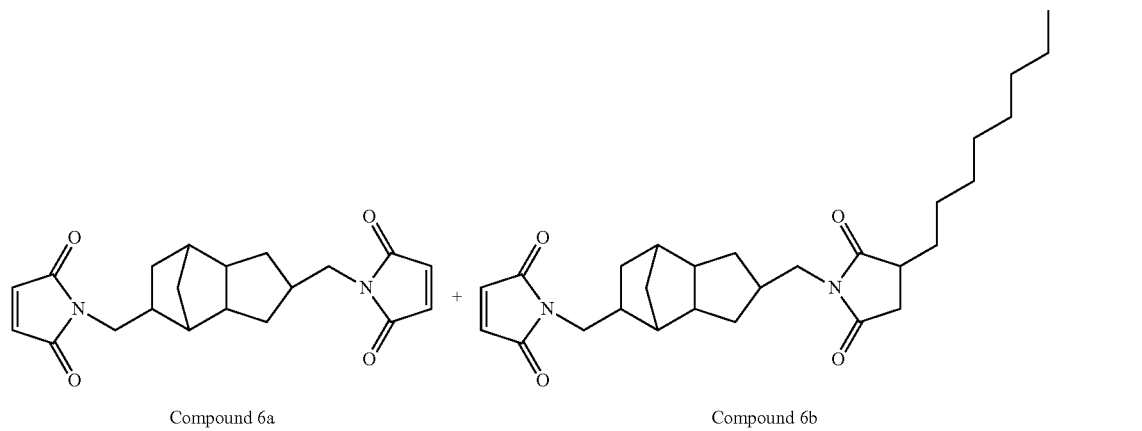
Compound 6a        Compound 6b
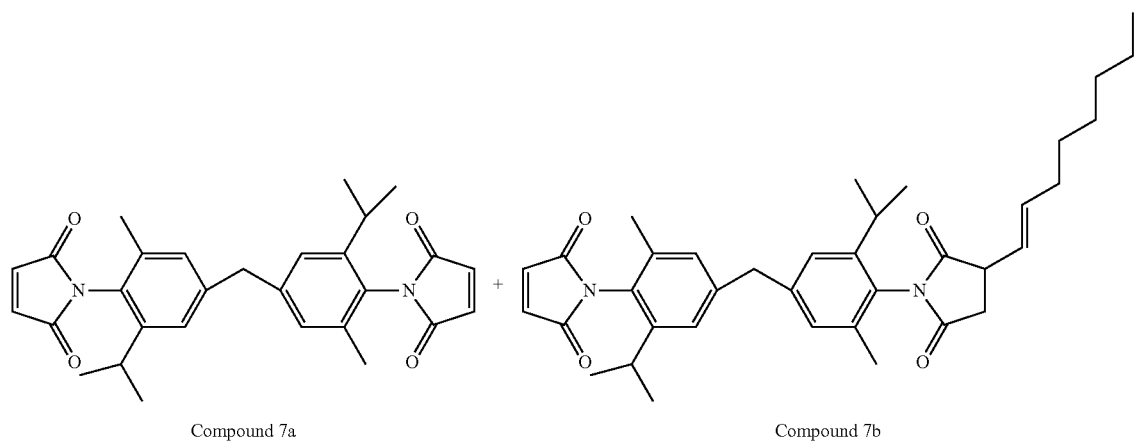
Compound 7a        Compound 7b
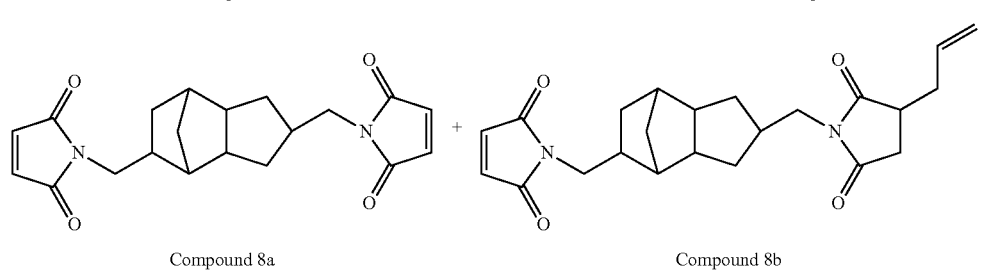
Compound 8a        Compound 8b

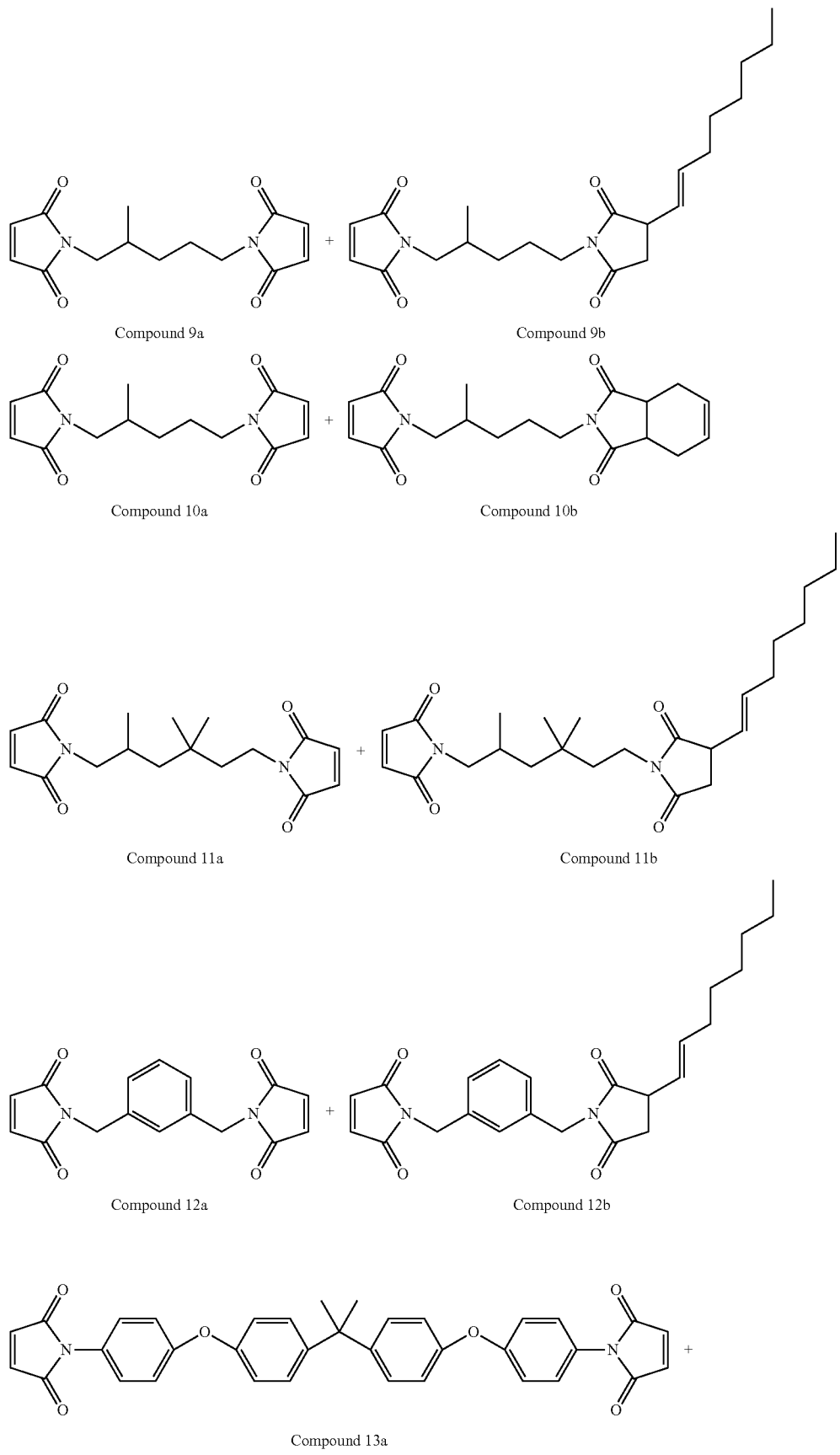

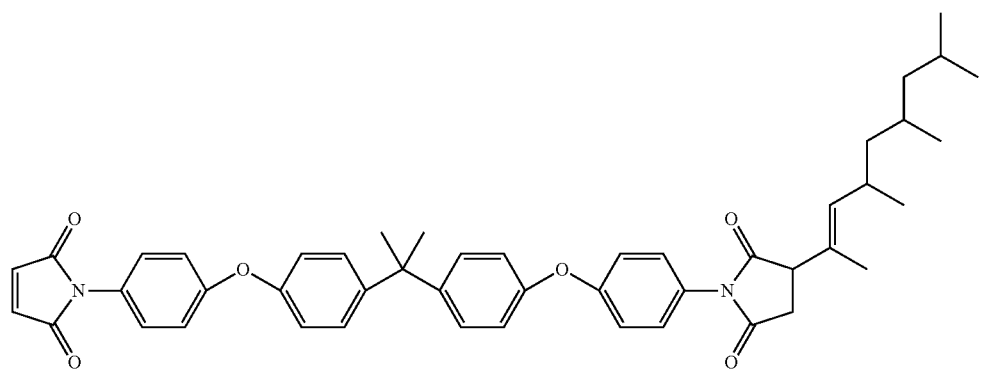
Compound 13b
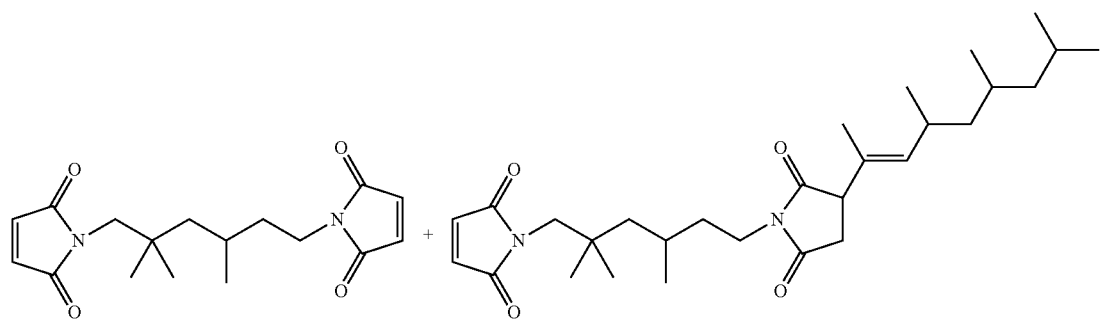
Compound 14a    Compound 14b
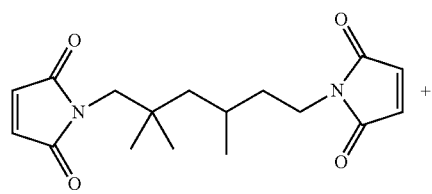
Compound 15a
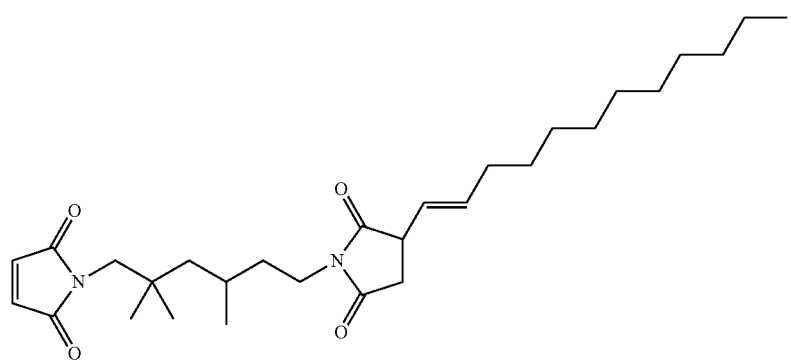
Compound 15b

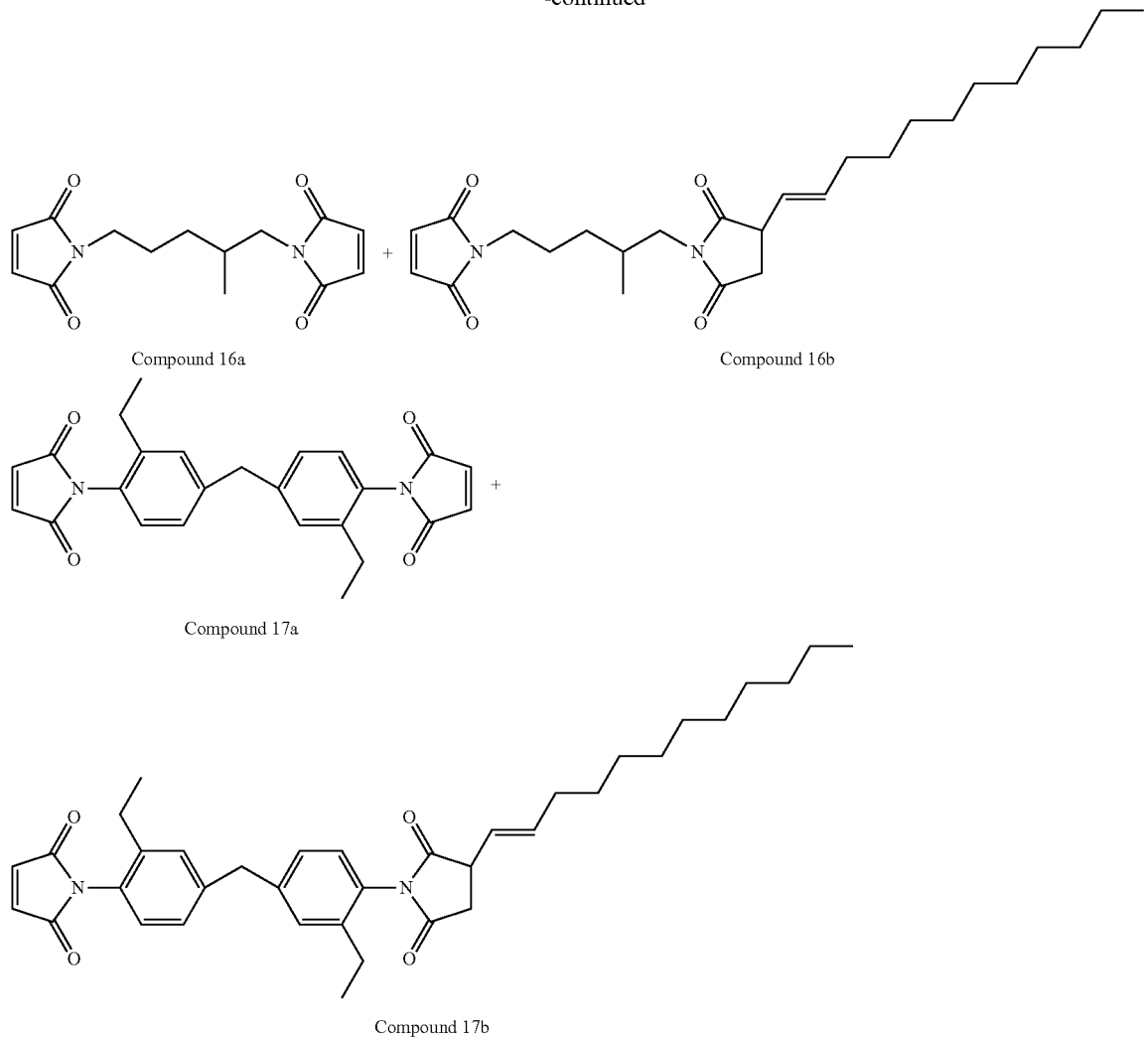

Compound 16a

Compound 16b

Compound 17a

Compound 17b

As can be seen from the structures 1a-17a, 1b-17b and 3c, the compound mixtures of the present invention are generally mixtures of mono-maleimide and bismaleimide monomers. These mixtures are generated in situ from the condensation of diamine compounds with maleic anhydride along with one or more additional anhydrides, as discussed above. In some cases the other anhydride(s), themselves, may also contain polymerizable functionality, although this is not required.

While not wishing to be bound by a particular theory, the incorporation of non-maleimide imide residues into the backbone is thought to disrupt the tendency of the invention compound mixtures to crystallize and therefore the materials of this invention exist as amorphous solids or liquids. The amorphous character of the products of this invention, have all of the aforementioned benefits over high melting, crystalline BMI monomers for real world applications and therefore offer distinct advantages over known BMI compounds.

In some embodiments the amorphous, maleimide-functional compounds of this invention are glassy solids at room temperature. In other embodiments the amorphous MI-BMI monomer mixtures of this invention are liquid at room temperature.

As will be understood by those of skill in the art, there are practical limitations on the level of non-maleimide functionality that may be present in the compounds of this invention. When the maleimide content is too low, then there will be a large fraction of the product that does not contain maleimide functionality on either side of the molecule. Low maleimide functionality is generally only acceptable wherein the non-maleimide imide itself bears a polymerizable group. When the maleimide content is too high, then the crystallinity of the BMI may not be sufficiently depressed and the mixed maleimide-imide products may revert to semi-crystalline solids on cooling from the melt.

The equivalent percent of maleimide functionality in the mixed monomers of this invention is typically between about 50% and about 95%. Frequently, the equivalent percent of maleimide functionality is between about 60 and about 90%. Most often, the equivalent percent of maleimide functionality is between about 65% and about 85%.

Compositions Containing Compound Mixtures of the Invention

The present invention provides compositions containing at least one compound mixture set forth above. For example, the compound mixtures may be used independently as the monomers in a polymeric composition, such as an adhesive composition, or may be combined with other materials and reagents to prepare adhesive compositions. In certain embodiments, the compound mixtures may be combined with other adhesives and/or resins to prepare adhesive compositions. A compound mixture of the invention may be used as the sole monomers of an adhesive composition of the invention. In other embodiments, the compound mixture may be combined with other monomers, such as thermoset monomers, to make a fully formulated adhesive composition.

In certain embodiments of the invention, a compound mixture of the invention is present in a composition, such as an adhesive composition, in an amount from 0.5 weight percent (wt %) to about 98 wt %, based on the total weight of the composition. Typically, the composition will contain an amount of the compound mixture equal to at least about 5 wt %, often at least about 10 wt %, frequently at least about 20 wt %, and in some embodiments at least about 40 wt % based on the total weight of the composition.

In another embodiment of the invention, the composition containing the compound mixture of the invention includes at least one co-monomer, which is typically present in an amount from 10 wt % to about 90 wt %, based on the total weight of the composition. In some aspects of the invention, the composition will contain an amount of the co-monomer equal to at least about 15 wt %, often at least about 20 wt %, frequently at least about 25 wt %, and in some embodiments at least about 30 wt % based on the total weight of the composition. Co-monomers suitable for use in the compositions according to the invention include, but are not limited to, acrylates, methacrylates, maleimides, vinyl ethers, vinyl esters, acrylamides, methacrylamides, maleates, itaconates, fumarates, styrenic compounds, allylic functionalized compounds, epoxies, phenolics and phenyl esters.

Curing Initiators.

In certain embodiments, the present invention provides compositions, such as adhesive compositions, including at least one compound mixture of the invention and at least one curing initiator. The curing initiator is typically present in adhesive compositions of the invention at an amount from 0.1 wt % to about 5 wt %, based on total weight of the composition, and is typically a free-radical initiator. In some embodiments, the curing initiator is present at least about 0.5 wt %, often at least about 1 wt %, frequently at least about 2 wt %, at in some embodiments at least about 3 wt %, based on total weight of the composition.

Free-radical initiators contemplated for use in the practice of the present invention typically decompose (i.e., have a half life in the range of about 10 hours) at temperatures in the range of about 70° C. up to 180° C. Exemplary free radical initiators contemplated for use in the practice of the present invention include peroxides (e.g. dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide), azo compounds (e.g., 2,2'-azobis(2-methyl-propanenitrile), 2,2'-azobis(2-methylbutanenitrile), and 1,1'-azobis(cyclohexanecarbonitrile)). Other free-radical initiators that will be well-known in the art may also be suitable for use in the compositions of the present invention.

Photoinitiators.

Free radical initiators also include photoinitiators. For invention compositions that contain a photoinitiator, the curing process can be initiated, for example, by UV radiation. In one embodiment, the photoinitiator is present at a concentration of 0.1 wt % to 5 wt %, based on the total weight of the organic compounds in the composition (excluding any filler). In one embodiment, the photoinitiator comprises 0.5 wt % to 3.0 wt %, based on the total weight of the organic compounds in the composition. In other embodiments, the photoinitiator is present at least about 0.5 wt %, often at least about 1 wt %, frequently at least about 2 wt %, and in some embodiments at least about 3 wt %, based on the total weight of the organic compounds in the composition. Photoinitiators include benzoin derivatives, benzilketals, α,α-dialkoxyacetophenones, α-hydroxyalkylphenones, α-aminoalkylphenones, acylphosphine oxides, titanocene compounds, combinations of benzophenones and amines or Michler's ketone, and the like.

In some embodiments, both photoinitiation and thermal initiation may be desirable. For example, curing of a photoinitiator-containing adhesive can be started by UV irradiation, and in a later processing step, curing can be completed by the application of heat to accomplish a free-radical cure. Both UV and thermal initiators may therefore be added to the adhesive compositions of the invention.

Anionic Catalysts.

In other embodiments the initiator is an anionic catalyst. Examples of anionic initiators include Lewis bases such as tertiary amines and imidazoles. Specific examples include benzyldimethlamine, triethylamine, tripropylamine, pyridine, dimethylaminopyridine, dimethylethanolamine, diethylethanolamine, tributylamine, 2-methylimidazole, 2-undecylimidazole, 1-benzyl-2-methylimidazole, 1-cyanoethyl-2-methylimidazole, 1-cyanoethyl-2-phenylimidazole, 1-cyanoethyl-2-undecylimidazole, 1-cyanoethyl-2-ethyl-4-methylimidazole, 1-cyanoethyl-2-isopropylimidazole, 1-cyanoethyl-2-methylimidazole-trimellitate, 1-cyanoethyl-2-phenylimidazole-trimellitate, 1-cyanoethyl-2-ethyl-4-methylimidazole-trimellitate, 1-cyanoethyl-2-undecylimidazole-trimellitate, 2,4-diamino-6-(2'methylimidazolyl-(1')) ethyl-s-triazine, 2,4-diamino-6-(2'-ethyl-4'-methylimidazolyl-(1'))ethyl-s-triazine, 2,4-diamino-6-(2'-undecylimidazolyl-(1'))ethyl-s-triazine, 2-phenyl-4-methyl-5-hydroxymethylimidazole, 2-phenyl-4,5-dihydroxymethylimidazole, 1-cyanoethyl-2-phenyl-4,5-di (cyanoethoxymethyl)imidazole, 2-methylimidazole-isocyanuric acid addition compound, 2-phenylimidazole-isocyanuric acid addition compound, 2,4-diamino-6[2'-methylimidazolyl-(1)']ethyl-s-triazine isocyanurate adduct, 4,4'-methylene-bis-(2-ethyl-5-methylimidazole), and the like.

Cationic Catalysts.

In other embodiments the initiator is a cationic catalyst. Specific examples include onium compounds. Specific examples include bis[4-(diphenylsulphonio)-phenyl]sulphide bis-hexafluorophosphate, bis[4-(di(2-hydroxyethyl)phenyl)sulphonio-phenyl]sulphide bis-hexafluorophosphate, bis[4-(di(4-(2-hydroxyethyl)phenyl)sulphonio)phenyl]sulphide bis-hexafluoroantimonate, ($\eta^5$-2,4-(cyclopentadienyl) [(1,2,3,4,5,6-$\eta$)-(methylethyl)-benzene]-iron(II) hexafluorophosphate, triarylsulphonium hexafluorophosphate, (tolylcumyl) iodonium tetrakis(pentafluorophenyl) borate, diaryl iodonium hexafluoroantimonate, and the like. In certain embodiments, the invention provides adhesive compositions including 0.5 wt % to about 98 wt % of at least one [compound] described herein, based on total weight of the composition; optionally, 10 wt % to about 90 wt % of at least one co-monomer selected from acrylates, methacrylates, maleimides, vinyl ethers, vinyl esters, styrenic compounds, allyl functional compounds, and olefins, based on total weight of the composition; 0 to about 90 wt % of a conductive filler; 0.1 wt % to about 5 wt % of at least one curing initiator, based on total weight of the composition; and 0.1 wt % to about 4 wt %, of at least one coupling agent, based on total weight of the composition.

Additional Co-Curing Compounds.

In certain aspects, the compositions, such as adhesive compositions of the invention include at least one additional compound that can co-cure with the compound mixtures of the invention. The additional compound is typically present in an adhesive composition from about 10 wt % to about 90 wt % based on total weight of the composition. In such aspects, the composition will typically contain an amount of the co-curing compound equal to at least about 20 wt %, often at least about 30 wt %, frequently at least about 40 wt %, and in some embodiments at least about 50 wt % based on the total weight of the composition.

Such compounds include, for example, epoxies (e.g. epoxies based on glydicyl ethers of alcohols, phenols, bisphenols, oligomeric phenolics, phenolic novolacs, cresolic novolacs, acrylates, methacrylates, maleimides, poly-phenol compounds (e.g. poly(4-hydroxystyrene)), anhydrides, dianhydrides, polyanhydrides such as styrene-maleic anhydride co-polymers, imides, carboxylic acids, dithiols, polythiols, phenol functional mono-maleimides, bismaleimides, poly-maleimides, mono-itaconates, mono-maleates, mono-fumarates, acrylic acid, methacrylic acid, cyanate esters, vinyl ethers, vinyl esters, or phenol functional esters, ureas, amides, polyolefins (e.g. amine, carboxylic acid, hydroxy, and epoxy functional) siloxanes (e.g. epoxy, phenolic, carboxylic acid, or thiol functional), cyanoacrylates, allyl functional compounds and styrenic, as well as combinations thereof. In yet further embodiments, the invention provides cured adhesives prepared from compositions that include at least one compound mixture of the invention.

Coupling Agents.

In certain aspects, the adhesive compositions of the invention include at least one additional coupling agent. Exemplary coupling agents contemplated for use in the practice of the present invention include silicate esters, metal acrylate salts (e.g., aluminum methacrylate), titanates (e.g., titanium methacryloxyethylacetoacetate triisopropoxide), zirconates, or compounds that contain a copolymerizable group and a chelating ligand (e.g., phosphine, mercaptan, acetoacetate, and the like). In some embodiments, the coupling agent contains both a co-polymerizable function (e.g., vinyl, acrylate, methacrylate, epoxy, thiol, anhydride, isocyanate, and phenol moieties) and a silicate ester function. The silicate ester portion of the coupling agent is capable of condensing with metal hydroxides present on the mineral surface of substrate, while the co-polymerizable function is capable of co-polymerizing with the other reactive components of invention adhesive compositions, such as die-attach pastes. In certain embodiments coupling agents contemplated for use in the practice of the invention are oligomeric silicate coupling agents such as poly(methoxyvinylsiloxane).

Adhesive Paste Compositions Containing Compound Mixtures of the Invention

In certain embodiments, the present invention provides adhesive compositions that are of various consistencies including, liquids, gels, pastes and solids. In one embodiment, the adhesive composition is a paste suitable for attaching an electronics die to a substrate (i.e., die-attach pastes). Die attach pastes of the invention are optimized for long-term reliability, rapid inline curing, long pot-life, viscosity and thixotropic control for fast automated dispensing and manufacturing.

In one embodiment, the present invention provides an adhesive composition that include 0.5 wt % to about 98 wt % based on total weight of the composition, of a compound mixture of the invention; 0 to about 90 wt % of a filler, based on total weight of the composition; 0.1 wt % to about 5 wt % of at least one curing initiator, based on total weight of the composition; and 0.1 wt % to about 4 wt %, of at least one coupling agent, based on total weight of the composition.

B-Stageable Adhesives

In certain embodiments, the adhesive compositions and die attach pastes of the invention are b-stageable. As used herein, "B-stageable" refers to the properties of an adhesive having a first solid phase followed by a tacky rubbery stage at elevated temperature, followed by yet another solid phase at an even higher temperature. The transition from the rubbery stage to the second solid phase is thermosetting. However, prior to that, the thermosetting material behaves similarly to a thermoplastic material. Thus, such adhesives allow for low lamination temperatures while providing high thermal stability.

The B-stageable adhesive can be dispensed onto a die or a substrate by a variety of methods well known to those skilled in the art. In some embodiments, the adhesive is cast from solution using techniques such as spin coating, spray coating, stencil printing, screen printing, and the like. This dual stage cure is especially attractive for applications were it is desirable to apply an adhesive in liquid form, cure the material to a non-tacky thermoplastic state, and then cure this B-staged adhesive in a final heating step to bond two or more parts together. Thus, this dual stage cure method of the invention is particularly advantageous for silicon wafer back coatings. The original adhesive mixture can be spin coated onto the back of a silicon wafer. The coating can then be B-staged with heat or light. The coated wafers can then be diced to yield individual microelectronic components, which may be thermally attached directly to a substrate, and/or stacked together. The thermal "tacking step" re-liquifies the adhesive coating and provides a thermoplastic bond between the parts. The final bonding step involves a thermal (or in some cases light-based) cure to cross-link the B-staged adhesive composition. This method of assembly is highly desirable because it is easier to manufacture (especially for stacked die) than a traditional liquid adhesive assembly, and is much less expensive and wasteful compared to film-based adhesive technology.

In certain embodiments, a solvent may be employed in the practice of the invention. For example, when the B-stageable adhesive is spin-coated onto a circular wafer, it is desirable to have an even coating throughout the entire wafer, i.e., the solvent or solvent system should have the ability to deliver the same amount of adhesive to each point on the wafer. Thus, the adhesive will be evenly coated throughout, i.e., there will be the same amount of material at the center of the wafer as at the edges. Ideally, the adhesive is "Newtonian", with a thixotropic slope of 1.0. In certain embodiments, the solvent or solvent systems used to dispense the B-stageable adhesive have slopes ranging from 1.0 to about 1.2.

In some instances, the B-stageable adhesive is dispensed onto the backside of a die that has been coated with a polyimide. Thus, the solvent or solvent system used to dispense the B-stageable adhesive should not have any deleterious effects on the polyimide coating. To achieve this goal, in certain embodiments, the solvent system will include a polar solvent in combination with a nonpolar solvent. Typically, the polar solvent is suitable for use with the compound mixture described herein in B-stageable adhesives, and the nonpolar solvent is a non-solvent for the compound mixture. In addition, the polar solvent typically has a lower boiling point than the non-polar solvent. Without wishing to be to be limited to a particular theory, it is believed that when the adhesive is dispensed and then B-staged, the lower boiling polar solvent escapes first, leaving behind only the nonpolar non-solvent, essentially precipitating the oligomer uniformly and leaving the polyimide film undamaged.

In some embodiments, the solvent or solvent system has a boiling point ranging from about 150° C. up to about 300° C. In some embodiments, the solvent system is a combination of dimethyl phthalate (DMP), NOPAR 13, and terpineol. In other embodiments, the solvent system is a 1:1 (by volume) ratio of terpineol and NOPAR 13.

In general, adhesive compositions such as die-attach pastes and B-stageable adhesive compositions of the invention, will cure within a temperature range of 80-220° C., and curing will be effected within a length of time of less than 1 minute up to about 60 minutes. The B-stageable adhesive composition may be pre-applied onto either a semiconductor die or onto a substrate. As will be understood by those skilled in the art, the time and temperature curing profile for each adhesive composition will vary, and different compositions can be designed to provide the curing profile that will be suited to a particular industrial manufacturing process.

Additional Compounds.

In certain embodiments, the compositions of the invention, such as adhesives (including die-attach paste adhesives), may contain modifiers that lend additional flexibility and toughness to the resultant cured adhesive. Such modifiers may be any thermoset or thermoplastic material having a $T_g$ of 50° C. or less, and typically will be a polymeric material characterized by free rotation about the chemical bonds, the presence of ether groups, and the absence of ring structures. Suitable such modifiers include polyacrylates, poly(butadiene), poly-THF (polymerized tetrahydrofuran, also known as poly(1,4-butanediol)), CTBN (carboxy-terminated butadiene-acrylonitrile) rubber, and polypropylene glycol. When present, toughening compounds may be present in an amount up to about 15 percent by weight of [a compound according to formula I] and any other monomer in the adhesive.

Inhibitors for free-radical cure may also be added to the adhesive compositions and die-attach pastes described herein to extend the useful shelf life. Examples of free-radical inhibitors include hindered phenols such as 2,6-di-tert-butyl-4-methylphenol; 2,6-di-tert-butyl-4-methoxyphenol; tert-butyl hydroquinone; tetrakis(methylene(3,5-di-tert-butyl-4-hydroxyhydrocinnamate))benzene; 2,2'-methylenebis(6-tert-butyl-p-cresol); and 1,3,5-trimethyl-2,4,6-tris(3',5'-di-tert-butyl-4-hydroxybenzyl)benzene. Other useful hydrogen-donating antioxidants such as derivatives of p-phenylenediamine and diphenylamine. It is also well know in the art that hydrogen-donating antioxidants may be synergistically combined with quinones and metal deactivators to make a very efficient inhibitor package. Examples of suitable quinones include benzoquinone, 2-tert butyl-1,4-benzoquinone; 2-phenyl-1,4-benzoquinone; naphthoquinone, and 2,5-dichloro-1,4-benzoquinone. Examples of metal deactivators include N,N'-bis(3,5-di-tert-butyl-4-hydroxyhydrocinnamoyl)hydrazine; oxalyl bis(benzylidenehydrazide); and N-phenyl-N'-(4-toluenesulfonyl)-p-phenylenediamine. Nitroxyl radical compounds such as TEMPO (2,2,6,6-tetramethyl-1-piperidnyloxy, free radical) are also effective as inhibitors at low concentrations. The total amount of antioxidant plus synergists typically falls in the range of 100 to 2000 ppm relative to the weight of total base resin. Other additives, such as adhesion promoters, in types and amounts known in the art, may also be added.

The adhesive compositions, such as die-attach paste adhesives, described herein will generally perform within the commercially acceptable ranges for die attach adhesives. Commercially acceptable values for die shear for the adhesives on a 80×80 mil$^2$ silicon die are in the range of greater than or equal to 1 kg at room temperature, and greater than or equal to 0.5 kg at 260° C. Acceptable values for warpage for a 500×500 mil$^2$ die are in the range of less than or equal to 70 Nm at room temperature.

Fillers.

In some embodiments, fillers are contemplated for use in the practice of the present invention, which can be electrically conductive and/or thermally conductive, and/or fillers which act primarily to modify the rheology of the resulting composition. Examples of suitable electrically conductive fillers that can be employed in the practice of the present invention include silver, nickel, copper, aluminum, palladium, gold, graphite, metal-coated graphite (e.g., nickel-coated graphite, copper-coated graphite, and the like), and the like. Examples of suitable thermally conductive fillers that can be employed in the practice of the present invention include graphite, aluminum nitride, silicon carbide, boron nitride, diamond dust, zinc oxide, alumina, and the like. Compounds which act primarily to modify rheology include polysiloxanes (such as polydimethyl siloxanes), silica, fumed silica, fumed alumina, fumed titanium dioxide, calcium carbonate and the like.

Underfill Compositions

During its normal service life, an electronic assembly is subjected to repeated cycles of widely varying temperature. Due to the differences in the coefficient of thermal expansion between the electronic component, the solder, and the substrate, thermal cycling can stress the components of the assembly and cause it to fail. To prevent the failure, the gap between the component and the substrate is filled with an underfill material to reinforce the solder material and to absorb some of the stress of the thermal cycling.

In practice, the underfill material is typically dispensed into the gap between and electronic component (such as a flip-chip) and the substrate by injecting the underfill along two or more sides of the component, with the underfill material flowing, usually by capillary action, to fill the gap. Alternatively, underfilling can be accomplished by backfilling the gap between the electronic component and the substrate through a hole in the substrate beneath the chip. In either method, the underfill material must be sufficiently fluid to permit filling very small gaps.

The requirements and preferences for underfills are well known in the art. Specifically, monomers for use in underfills should have high $T_g$ and low $\alpha_1$ CTE, important properties. A high $T_g$, preferably in the range of at least about 100-135° C., and a low modulus or $\alpha_1$, preferably lower than about 60-65 ppm/° C., are optimal for underfill compositions.

The compound mixtures of the invention are particularly suited as monomers or co-monomers in underfill composition. Thus, the present invention provides underfill compositions including at least one compound mixture of the invention. Optionally, the underfill will also contain a fluxing agent and/or a filler.

Two prominent uses for underfill technology are in packages known in the industry as flip-chip, in which a chip is attached to a lead frame, and ball grid array, in which a package of one or more chips is attached to a printed wire board.

The underfill encapsulation may take place after the reflow of the metallic or polymeric interconnect, or it may take place simultaneously with the reflow. If underfill encapsulation takes place after reflow of the interconnect, a measured amount of underfill encapsulant material will be dispensed along one or more peripheral sides of the electronic assembly and capillary action within the component-to-substrate gap draws the material inward. The substrate may be preheated if needed to achieve the desired level of encapsulant viscosity for the optimum capillary action. After the gap is filled, additional underfill encapsulant may be dispensed along the complete assembly periphery to help reduce stress concentrations and prolong the fatigue life of the assembled structure. The underfill encapsulant is subsequently cured to reach its optimized final properties.

If underfill encapsulation is to take place simultaneously with reflow of the solder or polymeric interconnects, the underfill encapsulant, which can include a fluxing agent if solder is the interconnect material, first is applied to either the substrate or the component; then terminals on the component and substrate are aligned and contacted and the assembly heated to reflow the metallic or polymeric interconnect material. During this heating process, curing of the underfill encapsulant occurs simultaneously with reflow of the metallic or polymeric interconnect material.

A wide variety of acids are contemplated for use as the acidic fluxing agent. Typically, the acidic fluxing agent is a carboxylic acid such as, for example, 3-cyclohexene-1-carboxylic acid, 2-hexeneoic acid, 3-hexeneoic acid, 4-hexeneoic acid, acrylic acid, methacrylic acid, crotonic acid, vinyl acetic acid, tiglic acid, 3,3-dimethylacrylic acid, trans-2-pentenoic acid, 4-pentenoic acid, trans-2-methyl-2-pentenoic acid, 2,2-dimethyl-4-pentenoic acid, trans-2-hexenoic acid, trans-3-hexenoic acid, 2-ethyl-2-hexenoic acid, 6-heptenoic acid, 2-octenoic acid, (+/−)-citronellic acid, (R)-(+)-citronellic acid, (S)-(−)-citronellic acid, undecylenic acid, myristolic acid, palmitoleic acid, oleic acid, elaidic acid, cis-11-eicosenoic acid, erucic acid, nervonic acid, cis-3-chloroacrylic acid, trans-3-chloroacrylic acid, 2-bromoacrylic acid, 2-(trifluoromethyl)acrylic acid, 2-(bromomethyl)acrylic acid, 2-cyclopentene-1-acetic acid, (1R-trans)-2-(bromomethyl)-2-methyl-3-methylenecyclopentaneacetic acid, 2-acetamidoacrylic acid, 5-norbornene-2-carboxylic acid, 3-(phenylthio)acrylic acid, trans-styrylacetic acid, trans-cinnamic acid, alpha-methylcinnamic acid, alpha-phenylcinnamic acid, 2-(trifluoromethyl)cinnamic acid, 2-chlorocinnamic acid, 2-methoxycinnamic acid, cis-2-methoxycinnamic acid, 3-methoxycinnamic acid, 4-methylcinnamic acid, 4-methoxycinnamic acid, 2,5-dimethoxycinnamic acid, 3,4-(methylenedioxy)cinnamic acid, 2,4,5-trimethoxycinnamic acid, 3-methylindene-2-carboxylic acid, and trans-3-(4-methylbenzoyl)acrylic acid, oxalic acid, malonic acid, methylmalonic acid, ethylmalonic acid, butylmalonic acid, dimethylmalonic acid, diethylmalonic acid, succinic acid, methylsuccinic acid, 2,2-dimethylsuccinic acid, 2-ethyl-2-methylsuccinic acid, 2,3-dimethylsuccinic acid, meso-2,3-dimethylsuccinic acid, glutaric acid, (+/−)-2-methylglutaric acid, 3-methylglutaric acid, 2,2-dimethylglutaric acid, 2,4-dimethylglutaric acid, 3,3-dimethylglutaric acid, adipic acid, 3-methyladipic acid, (R)-(+)-3-methyladipic acid, 2,2,5,5-tetramethylhexanedioic acid, pimelic acid, suberic acid, azelaic acid, 1,10-decanedicarboxylic acid, sebacic acid, 1,11-undecanedicarboxylic acid, undecanedioic acid, 1,12-dodecanedicarboxylic acid, hexadecanedioic acid, docosanedioic acid, tetracosanedioic acid, tricarballylic acid, beta-methyltricarballylic acid, 1,2,3,4-butanetetracarboxylic acid, itaconic acid, maleic acid, fumaric acid, citraconic acid, mesaconic acid, trans-glutatonic acid, trans-beta-hydromuconic acid, trans-traumatic acid, trans, trans-muconic acid, cis-aconitic acid, trans aconitic acid, (+/−)-chlorosuccinic acid, (+/−)-bromosuccinic acid, meso-2,3-dibromosuccinic acid, hexa fluoroglutaric acid, perfluoroadipic acid hydrate, dibromo-maleic acid, DL-malic acid, D-malic acid, L-malic acid, (R)-(−)-citramalic acid, (S)-(+)-citramalic acid, (+/−)-2-isopropylmalic acid, 3-hydroxy-3-methylglutaric acid, ketomalonic acid monohydrate, DL-tartaric acid, L-tartaric acid, D-tartaric acid, mucic acid, citric acid, citric acid monohydrate, dihydroflumaric acid hydrate, tetrahydrofuran-2,3,4,5-tetracarboxylic acid, mercaptosuccinic acid, meso-2,3-dimercaptosuccinic acid, thiodiglycolic acid, 3,3'-thiodipropionic acid, 3,3'-dithiodipropionic acid, 3-carboxypropyl disulfide, (+/−)-2-(carboxymethylthio) succinic acid, 2,2',2",2"'-[1,2-ethanediylidenetetrakis(thio)]-tetrakisacetic acid, nitromethanetrispropionic acid, oxalacetic acid, 2-ketoglutaric acid, 2-oxoadipic acid hydrate, 1,3-acetonedicarboxylic acid, 3-oxoadipic acid, 4-ketopimelic acid, 5-oxoazelaic acid, chelidonic acid, 1,1-cyclopropanedicarboxylic acid, 1,1-cyclobutanedicarboxylic acid, (+/−)-trans-1,2-cyclobutanedicarboxylic acid, trans-DL-1,2-cyclopentanedicarboxylic acid, 3,3-tetramethyleneglutaric acid, (1R.3S)-(+)-camphoric acid, (1S.3R)-(−)-camphoric acid, (+/−)-cyclohexylsuccinic acid, 1,1-cyclohexanediacetic acid, (+/−)-trans-1,2-cyclohexanedicarboxylic acid, (+/−)-1,3-cyclohexanedicarboxylic acid, trans-1,2-cyclohexanedicarboxylic acid, 1,4-cyclohexanedicarboxylic acid, 1,3-adamantanedicarboxylic acid, 3-methylenecyclopropane-trans-1,2-dicarboxylic acid, cis-5-norbornene-endo-2,3-dicarboxylic acid, 1,3,5-cyclohexanetricarboxylic acid, 1,3,5-cyclohexanetricarboxylic acid, kemp's triacid, (1alpha.3alpha.5beta)-1,3,5-trimethyl-1,3,5-cyclohexanetricarboxylic acid, 1,2,3,4-cyclobutane-tetracarboxylic acid, and 1,2,3,4,5,6-cyclo-hexanehexacarboxylic acid monohydrate, phenylmalonic acid, benzylmalonic acid, phenylsuccinic acid, 3-phenylglutaric acid, 1,2-phenylenediacetic acid, homophthalic acid, 1,3-phenylenediacetic acid, 4-carboxyphenoxyacetic acid, 1,4-phenylenediacetic acid, 2,5-dihydroxy-1,4-benzenediacetic acid, 1,4-phenylenediacrylic acid, phthalic acid, isophthalic acid, 1,2,3-benzenetricarboxylic acid hydrate, terephthalic acid, 1,2,4-benzenetricarboxylic acid, 1,2,4,5-benzenetetracarboxylic acid, mellitic acid, 3-(carboxymethylaminomethyl)-4-hydroxybenzoic acid, 4-methylphthalic acid, 2-bromoterephthalic acid, 4-bromoisophthalic acid, 4-hydroxyisophthalic acid, 4-nitrophthalic acid, nitrophthalic acid, 1,4-phenylenedipropionic acid, 5-tert-butylisophthalic acid, 5-hydroxyisophthalic acid, 5-nitroisophthalic acid, 5-(4-carboxy-2-nitrophenoxy)-isophthalic acid, diphenic acid, 4,4'-biphenyldicarboxylic acid, 5,5' dithiobis(2-nitrobenzoic acid), 4-[4-(2-carboxybenozoyl)phenyl]-butyric acid, pamoic acid, 1,4-naphthalenedicarboxylic acid, 2,3-naphthalenedicarboxylic acid, 2,6-naphthalenedicarboxylic acid, 1,4,5,8-naphthalene-tetracarboxylic acid hydrate, 2,7-di-tert-butyl-9,9-dimethyl-4,5-xanthenedicarboxylic acid, and the like.

A particularly useful carboxylic acid for the preparation of the latent fluxing agents of the present invention is DIACID 1550®, a monocyclic $C_{21}$ dicarboxylic acid product derived from tall oil fatty acids, commercially available from Westvaco Corporation, New York, N.Y.

Mold Compounds and Compositions

In the electronics industry, a semiconductor chip or die mounted to a "package" substrate may be overmolded with a mold compound to provide a level of protection from environmental effects such as moisture and contaminants.

In terms of reliability performance, various properties of mold compositions materials are generally considered important. The properties desirable for mold compositions are known in the art. See, for example, U.S. Pat. Nos. 7,294,915, 6,512,031 and 6,429,238. These include low CTE, low modulus, adhesion, and high fracture toughness of the cured resin. A high $T_g$, preferably in the range of at least about 100-135° C., and a low modulus or $\alpha_1$, preferably lower than about 60-65 ppm/° C., are optimal for mold compositions. See, for example, U.S. Pat. Nos. 6,512,031 and 5,834,848. A typical overmolding process places a solid or semi-solid molding compound over the chip using a mold press. The package is then transferred through a heated mold that causes the molding compound to flow and encapsulate the chip.

Mold compositions are highly filled compositions. They are typically filled with silica. This high filler loading is critical to their performance in terms of CTE (coefficient of thermal expansion), flame retardance, and thermal conductivity.

The compounds of the present invention were found to have properties desirable of mold compounds. Specifically, the compound mixtures of the invention have a high $T_g$ and low $\alpha_1$ CTE. A high $T_g$, preferably in the range of at least about 100-135° C., and a low modulus or $\alpha_1$, preferably lower than about 60-65 ppm/° C., are optimal for mold compositions. Thus, the present invention provides mold compositions containing at least one above-described mixture of monomers.

Assemblies

The present invention also provides assemblies of components adhered together by the above-described adhesive compositions (e.g., B-stageable adhesives and die-attach pastes) of the invention. Thus, for example, assemblies comprising a first article adhered to a second article by a cured aliquot of an adhesive composition containing at least one compound mixture of the invention are provided. Articles contemplated for assembly employing invention compositions include electronic components such as dies, memory devices (e.g. as flash memory devices), ASIC devices, microprocessors, and other microelectronic components. Assemblies also include microelectronic devices, such as copper lead frames, Alloy 42 lead frames, silicon dice, gallium arsenide dice, and germanium dice, that are adhered to a substrate by a cured aliquot of the above-described adhesive compositions Additional embodiments of the invention include adhesively bonded structures containing at least one compound mixture described herein. Non-limiting examples of the adhesively bonded structures include electronic components bonded to a substrate, and circuit components bonded to printed wire boards. In other embodiments of the invention, articles of manufactures can be comprised substantially of a cured amount of the composition described herein, such as an industrial, marine, automotive, airline, aerospace, sporting goods, medical or dental article. Such articles of manufacture can also include fillers, extenders, pigments and/or reinforcing materials along with the compositions disclosed herein.

Conditions suitable to cure invention die attach paste adhesives include subjecting the above-described assembly to a temperature of less than about 200° C. for about 0.5 up to 2 minutes. This rapid, short duration heating can be accomplished in a variety of ways, e.g., with an in-line heated rail, a belt furnace, or the like. Optionally, the material can be oven cured at 150-220° C.

In other embodiments the invention provides methods for attaching a semiconductor die to a substrate. Such methods can be performed, for example, by (a) applying a die-attach adhesive composition described herein to the substrate and/or the semiconductor die, (b) bringing the substrate and the die into contact to form an assembly, such that the substrate and the die are separated only by the die-attach adhesive composition applied in step (a), and (c) subjecting the assembly to conditions sufficient to cure the die-attach paste, thereby attaching the semiconductor die to the substrate.

Methods of Using Containing Compound Mixtures and Adhesive Compositions of the Invention According to the present invention, methods for adhesively attaching a first article to a second article are provided. Such methods can be performed, for example, by a) applying an adhesive composition of the invention to the first article, the second article or both the first and second articles; b) contacting the first article and the second article, where the first article and the second article are separated only by the adhesive composition applied in step a); and c) curing the adhesive composition applied in step a), thereby adhesively attaching the first article to the second article.

In one aspect of this method, the first and second articles are a semiconductor die and a substrate, respectively. Typically, according to this aspect the adhesive is a die attach paste. The method can include the steps of applying the adhesive composition (e.g. die attach paste) to the substrate, the semiconductor die, or both the substrate and the semiconductor die; b) melting the adhesive composition applied in step a); c) contacting the semiconductor device and the substrate, where the die and substrate are separated only by the adhesive composition applied in step a); and d) curing the adhesive composition applied in step a), thereby adhesively attaching the semiconductor device to the substrate. Applying the adhesive composition can include spin-coating, spray coating, stencil printing, screen printing and other methods well known in the art.

It will be understood those of skill in the art that using the compounds and methods of the present invention, it is possible to prepare adhesives having a wide range of cross-link density by the judicious choice and amount of a compound mixture of the invention. The greater proportion of polyfunctional compounds reacted, the greater the cross-link density. If thermoplastic properties are desired, the adhesive compositions can be prepared from (or at least contain a higher percentage of) mono-functional compounds to limit the cross-link density. A minor amount of poly-functional compounds can be added to provide some cross-linking and strength to the composition, provided the amount of poly-functional compounds is limited to an amount that does not diminish the desired thermoplastic properties. Within these parameters, the strength and elasticity of individual adhesives can be tailored to a particular end-use application.

In still further embodiments, the invention provides B-stageable type methods for adhesively attaching a semiconductor die to a substrate. Such methods can be performed, for example, by applying an invention adhesive composition to the substrate, the semiconductor device or both the substrate and the semiconductor device; melting the applied adhesive composition applied; (c) contacting the semiconductor device and the substrate, such that the die and substrate are separated only by the applied adhesive composition; and curing the applied adhesive composition, thereby attaching the semiconductor device to the substrate.

Properties of Adhesives Containing Compound Mixtures of the Invention

The compound mixtures of the invention can impart many properties that are desirable in an adhesive. In some embodiments the amorphous, maleimide-functional compound mixtures of this invention are glassy solids at room temperature. In other embodiments the amorphous MI-BMI monomer mixtures of this invention are liquid at room temperature.

The invention will now be further described with reference to by the following illustrative, non-limiting examples.

EXAMPLES

Example 1

Preparation of Compound Mixture 1a-1b

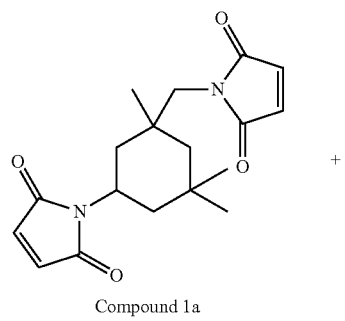

Compound 1a

+

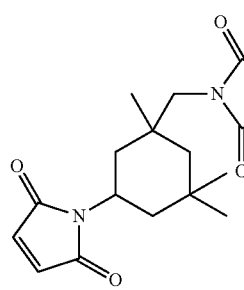

Compound 1b

A 500 ml, one-neck flask was charged with 29.91 g (0.305 mole) maleic anhydride, 22.08 g (0.105 mole) 2-octenylsuccinic anhydride, 30 ml N-methylpyrrolidone (NMP), and 120 ml toluene. This mixture was stirred magnetically and heated to 50° C. to obtain a homogeneous solution and then 34.06 g (0.200 mole) isophorone diamine was dripped in over fifteen minutes. Amic acid solids formed but remained as a milky tan dispersion in the stirred mixture. The flask was then charged with 3.0 g methanesulfonic acid and a Dean-Stark trap plus a condenser were attached to the flask. The mixture was refluxed for forty-eight hours to collect 6.7 ml water. The solution was cooled and then extracted with 5×25 ml water (to remove most of the NMP), neutralized with 10 g sodium bicarbonate, dried with 10 g magnesium sulfate and then passed over 15 g silica gel. The toluene and residual NMP was removed via rotary evaporation under vacuum followed by a ten-hour air sparge at 90° C.

The product was an amber, glassy solid at room temperature that weighed 71.05 g (99.1% of theory). An FTIR trace run on this compound revealed prominent absorptions at 2927, 1703, 1463, 1403, 1373, 1220, 1146, 974, 828, and 695 wavenumbers. A portion of this compound was catalyzed with 2% by weight dicumyl peroxide. Differential scanning calorimetry (DSC) on the catalyzed mix revealed a cure onset at 134.2° C., cure maxima at 147.3° C. and cure energy of 192.0 J/g. Thermogravimetric analysis (TGA, ramp rate at 10° C./minute, air purge) run on the catalyzed mix demonstrated residual weights of 100.0%, 99.64%, and 97.90% at 100, 200 and 300° C., respectively. The thermal decomposition onset temperature was 422.8° C.

Example 2

Preparation of Compound Mixture 2a-2b

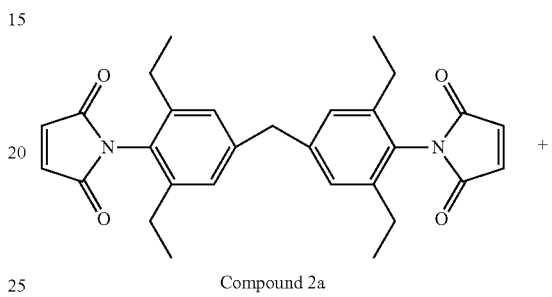

Compound 2a

+

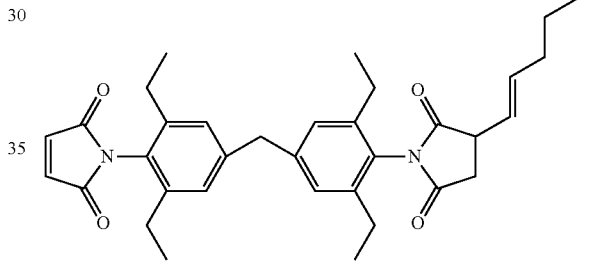

Compound 2b

A 500 ml, one-neck flask was charged with 15.0 g (0.153 mole) maleic anhydride, 10.72 g (0.051 mole) 2-octenylsuccinic anhydride, and 100 ml toluene. This mixture was stirred magnetically and heated to 60° C. to fully dissolve the maleic anhydride and then 31.05 g (0.100 mole) 4,4'-methylenebis-(2,6-diethyl)-aniline (Lonzacure® M-DEA, Lonza Group Ltd., Basel, Switzerland) dissolved in 100 ml warm toluene was dripped in over fifteen minutes. There were several striking color changes observed during this addition. Ultimately, a dispersion of purple-gray amic acid solids formed which remained suspended in the stirred mixture. The flask was then charged with 2.0 g methanesulfonic acid and a Dean-Stark trap plus a condenser were attached to the flask. The mixture was refluxed for 4.33 hours to collect 3.6 ml water. The solution was cooled and then neutralized with 10 g sodium bicarbonate plus 2 g water, dried with 5 g magnesium sulfate and then passed over 15 g silica gel. The toluene was removed via rotary evaporation under vacuum followed by air sparge at 70° C.

The product was a clear, yellow, glassy solid at room temperature that weighed 50.98 g (96.8% of theory). An FTIR trace run on this compound revealed prominent absorptions at 3472, 3098, 2967, 1709, 1600, 1475, 1377, 1184, 1152, 828, and 692 wavenumbers. A portion of this compound was catalyzed with 2% by weight dicumyl peroxide. A TGA (ramp rate at 10° C./minute, air purge) was run on the catalyzed mix and a residual weight of 98.09% at 300° C. was observed. The thermal decomposition onset temperature was 479.2° C.

Example 3

Preparation of Compound Mixture 3a, 3b and 3c

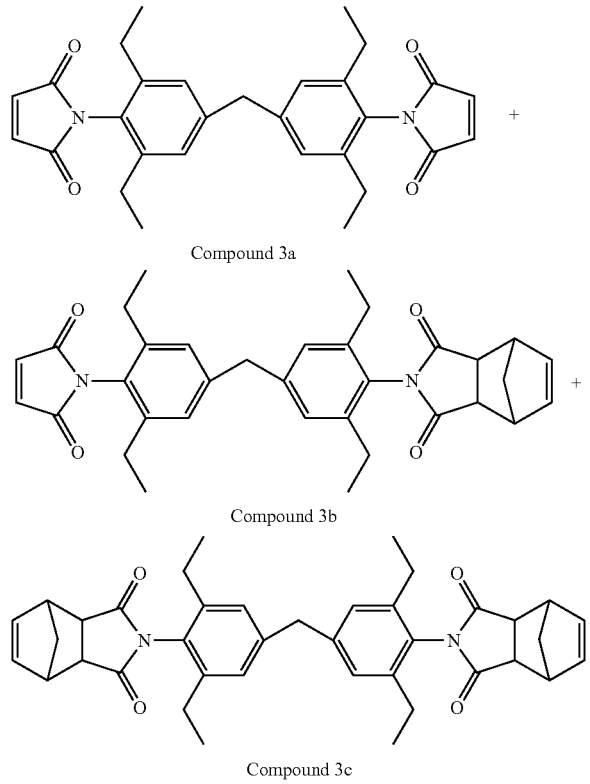

Compound 3a

Compound 3b

Compound 3c

A 500 ml, one-neck flask was charged with 10.8 g (0.110 mole) maleic anhydride, 18.05 g (0.110 mole) 5-norbornene-2,3-dicarboxylic anhydride, and 200 ml toluene. This mixture was stirred magnetically and heated to 60° C. to fully dissolve the anhydride solids and then 31.05 g (0.100 mole) Lonzacure® M-DEA was added in small portions over ten minutes. The flask was then charged with 2.5 g methanesulfonic acid and a Dean-Stark trap plus a condenser were attached to the flask. The mixture was refluxed for 26 hours to collect 3.5 ml water. The solution was cooled and then neutralized with 5 g sodium bicarbonate plus 2 g water, dried with 5 g magnesium sulfate and then passed over 15 g silica gel. The toluene was removed via rotary evaporation under vacuum followed by air sparge at 90° C. The product was transferred to non-stick aluminum foil and heated under mechanical vacuum at 120° C. for four hours.

The product was a, clear, yellow-orange, glassy solid at room temperature that weighed 53.06 g (94.2% of theory). An FTIR trace run on this compound revealed prominent absorptions at 3472, 3096, 2970, 1777, 1707, 1600, 1470, 1373, 1182, 911, 830, 718 and 692 wavenumbers. A portion of this compound was catalyzed with 2% by weight dicumyl peroxide. A DSC was run on the catalyzed mix revealed a cure onset at 163.8° C., cure maxima at 185.2° C. and cure energy of 81.9 J/g. A TGA (ramp rate at 10° C./minute, air purge) was run on the neat product and a residual weight of 97.53% at 300° C. and 96.94% at 400° C. was observed. The thermal decomposition onset temperature for this compound was 520.2° C.

Example 4

Preparation of Compound Mixture 5a-5b

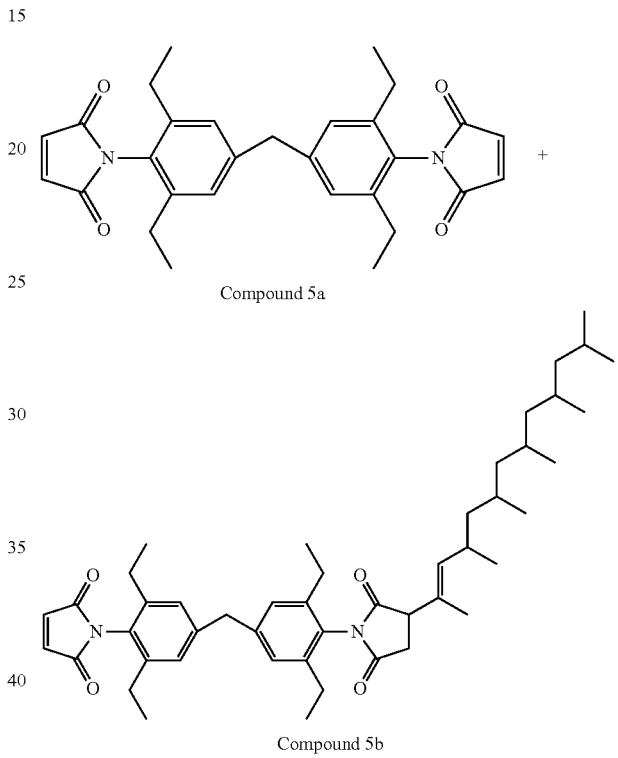

Compound 5a

Compound 5b

A 500 ml, one-neck flask was charged with 15.0 g (0.153 mole) maleic anhydride, 17.9 g (0.051 mole) 2-octadecenyl-succinic anhydride (ODSA, Dixie Chemical Co., Inc., Pasadena, Tex.), and 200 ml toluene. This mixture was stirred magnetically and heated to 60° C. to fully dissolve the maleic anhydride and then 31.05 g (0.100 mole) Lonzacure® M-DEA was added in portions over fifteen minutes. The flask was then charged with 2.0 g methanesulfonic acid and a Dean-Stark trap plus a condenser were attached to the flask. The mixture was refluxed for 15 hours to collect 3.4 ml water. The solution was cooled and then neutralized with 10 g sodium bicarbonate plus 2 g water, dried with 5 g magnesium sulfate and then passed over 15 g silica gel. The toluene was removed via rotary evaporation under vacuum followed by air sparge at 70° C.

The product was a clear, orange, tacky, glassy solid at room temperature that weighed 58.3 g (97.7% of theory). An FTIR trace run on this compound revealed prominent absorptions at 3475, 3099, 2925, 1710, 1601, 1475, 1377, 1185, 1153, 829, and 692 wavenumbers. A portion of this compound was catalyzed with 2% by weight dicumyl peroxide. A DSC was run on the catalyzed mix revealed a cure onset at 152.2° C., cure maxima at 179.1° C. and cure energy of 174.9 J/g. A TGA (ramp rate at 10° C./minute, air purge) was run on the catalyzed mix and a residual weight of 98.49% at 300° C. was observed. The thermal decomposition onset temperature was 485.1° C.

Example 5

Preparation of Compound Mixture 11a-11b

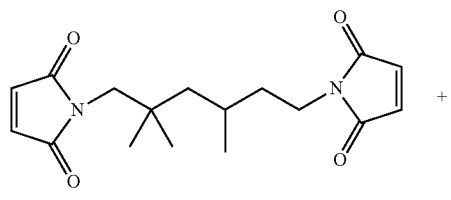

Compound 11a

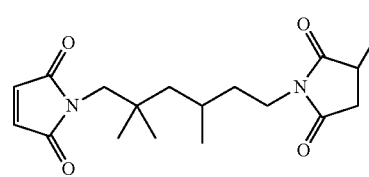

Compound 11b

A 500 ml, one-neck flask was charged with 25 g methanesulfonic acid, 20 g triethylamine, and 200 ml toluene. A Dean-Stark trap and condenser were attached to the flask. The mixture was stirred magnetically and heated to reflux to dehydrate the salt. When the solution cooled, 16.0 g (0.163 mole) maleic anhydride and 8.41 g (0.040 mole) octenylsuccinic anhydride were added to the mixture. When the solids were completely dissolved, 15.83 g (0.100 mole) 2,2,4-trimethyl-1,6-hexanediamine was dripped in. No amic acid crashed out of solution at this point. The mixture was refluxed for 25 hours and 3.5 ml water was collected. The solution was cooled and 25 ml water was added. The product was extracted with 6×25 ml toluene. The extractions were dried with 10 g magnesium sulfate then passed over 20 g silica gel. The toluene was removed via rotary evaporation under vacuum and air sparge.

The product was a viscous amber liquid that turned into an off-white waxy semi-solid upon standing. It weighed 25.05 g (68.9% theory). An FTIR trace run on this revealed prominent absorptions at 3454, 3099, 2930, 2872, 1770, 1695, 1587, 1439, 1404, 1138, 975, 825, and 694 wavenumbers. A portion of this compound was catalyzed with 2% by weight dicumyl peroxide. Differential scanning calorimetry (DSC) on the catalyzed mix revealed a cure onset at 131.2° C., cure maxima at 141.6° C., and cure energy of 263.2 J/g. Thermogravimetric analysis (TGA, ramp rate at 10° C./minute, air purge) run on the catalyzed mix demonstrated residual weights of 100.0%, 99.16%, and 97.94% at 100, 200, and 300° C., respectively. The thermal decomposition onset temperature was 462.1° C.

Example 6

Preparation of Compound Mixture 14a-14b

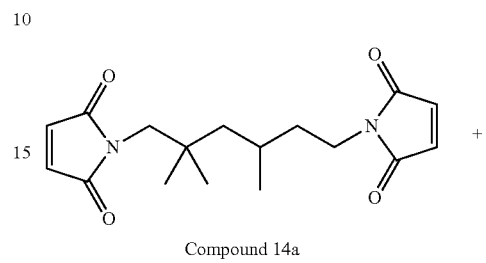

Compound 14a

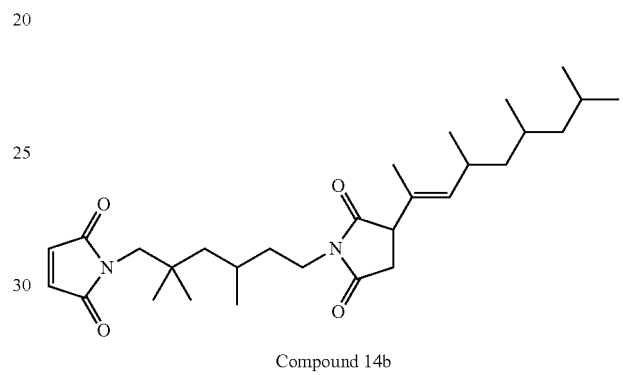

Compound 14b

A 500 ml, one-neck flask was charged with 25 g methanesulfonic acid, 20 g triethylamine, and 200 ml toluene. A Dean-Stark trap and condenser were attached to the flask. The mixture was stirred magnetically and heated to reflux to dehydrate the salt. When the solution cooled, 16.0 g (0.163 mole) maleic anhydride and 10.66 g (0.040 mole) dodecenylsuccinic anhydride were added to the mixture. When the solids were completely dissolved, 15.83 g (0.100 mole) 2,2,4-trimethyl-1,6-hexanediamine was dripped in. The mixture was refluxed for 5 days. The solution was cooled and 25 ml water was added. The product was extracted with 6×25 ml toluene. The extraction was dried with 10 g magnesium sulfate then passed over 20 g silica gel. The toluene was removed via rotary evaporation under vacuum and air sparge.

The product was a viscous amber liquid that slowly converted to a soft wax. It weighed 28.28 g (72.8% theory). An FTIR trace run on this revealed prominent absorptions at 3103, 2960, 1703, 1439, 1404, 1380, 1137, 917, 826, and 695 wavenumbers. A portion of this compound was catalyzed with 2% by weight dicumyl peroxide. Differential scanning calorimetry (DSC) on the catalyzed mix revealed a cure onset at 134.8° C., cure maxima at 144.5° C. and cure energy of 210.5 J/g. Thermogravimetric analysis (TGA, ramp rate at 10° C./minute, air purge) run on the catalyzed mix demonstrated residual weights of 99.80%, 98.63%, and 96.60% at 100, 200, and 300° C., respectively. The thermal decomposition onset temperature was 457.6° C.

Example 7

Preparation of Compound Mixture 15a-15b

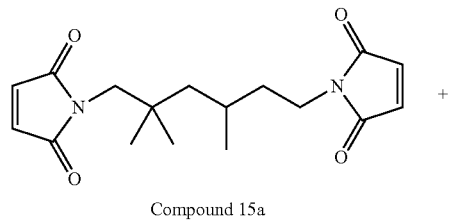

Compound 15a

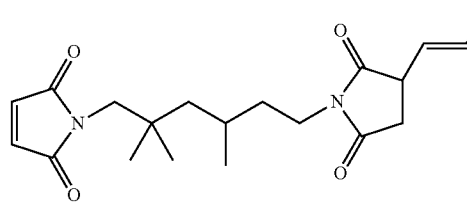

Compound 15b

A 500 ml, one-neck flask was charged with 15 g methanesulfonic acid, 12 g triethylamine, and 125 ml toluene. A Dean-Stark trap and condenser were attached to the flask. The mixture was stirred magnetically and heated to reflux to dehydrate the salt. When the solution cooled, 15.0 g (0.153 mole) maleic anhydride and 13.6 g (0.051 mole) n-dodecenylsuccinic anhydride were added to the mixture. When the solids were completely dissolved, 15.83 g (0.100 mole) 2,2,4-trimethyl-1,6-hexanediamine was dripped in. The mixture was refluxed for 46 hours. A total of 3.3 ml water was collected. The solution was cooled and extracted with 8×25 ml toluene. The extraction was passed over 20 g silica gel. The toluene was removed via rotary evaporation under vacuum and air sparge.

The product was a light yellow liquid converted into a white, soft, semisolid at room temperature. It weighed 26.68 g (65.8% theory). An FTIR trace run on this revealed prominent absorptions at 2924, 2855, 1782, 1694, 1439, 1404, 1370, 1138, 827, and 695 wavenumbers. A portion of this compound was catalyzed with 2% by weight dicumyl peroxide. Differential scanning calorimetry (DSC) on the catalyzed mix revealed a cure onset at 128.2° C., cure maxima at 137.3° C. and cure energy of 243.4 J/g. Thermogravimetric analysis (TGA, ramp rate at 10° C./minute, air purge) run on the catalyzed mix demonstrated residual weights of 99.97%, 99.36%, and 97.63% at 100, 200, and 300° C., respectively. The thermal decomposition onset temperature was 456.3° C.

Example 8

Preparation of Compound Mixture 16a-16b

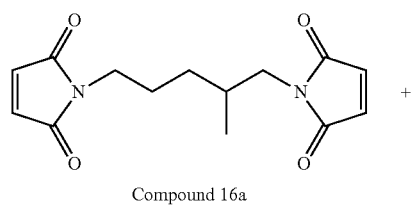

Compound 16a

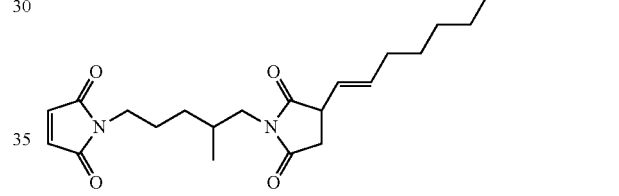

Compound 16b

A 500 ml, one-neck flask was charged with 15 g methanesulfonic acid, 12 g triethylamine, and 125 ml toluene. A Dean-Stark trap and condenser were attached to the flask. The mixture was stirred magnetically and heated to reflux to dehydrate the salt. When the solution cooled, 15.0 g (0.153 mole) maleic anhydride and 13.6 g (0.051 mole) n-dodecenylsuccinic anhydride were added to the mixture. When the solids were completely dissolved, 11.62 g (0.100 mole) 2-methylpentanediamine was dripped in. The mixture was refluxed for 59 hours. 3.1 ml water was collected. The solution was cooled and extracted with 8×25 ml toluene. The extraction was passed over 20 g silica gel. The toluene was removed via rotary evaporation under vacuum and air sparge.

The product was an almost colorless liquid that transformed to a soft waxy solid upon standing. It weighed 21.5 g (58.9% theory). An FTIR trace run on this revealed prominent absorptions at 3101, 2926, 2855, 1783, 1694, 1587, 1440, 1406, 1361, 1228, 1187, 1112, 971, 919, 827, and 694 wavenumbers. A portion of this compound was catalyzed with 2% by weight dicumyl peroxide. Differential scanning calorimetry (DSC) on the catalyzed mix revealed a cure onset at 122.9° C., cure maxima at 131.2° C. and cure energy of 280.3 J/g. Thermogravimetric analysis (TGA, ramp rate at 10° C./minute, air purge) run on the catalyzed mix demonstrated residual weights of 99.94%, 99.02%, and 94.98% at 100, 200, and 300° C., respectively. The thermal decomposition onset temperature was 452.1° C.

Example 9

Preparation of Compound Mixture 17a-17b

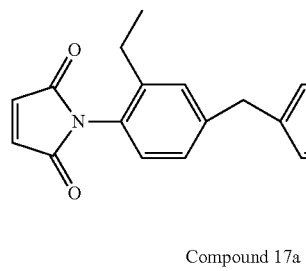

Compound 17a

+

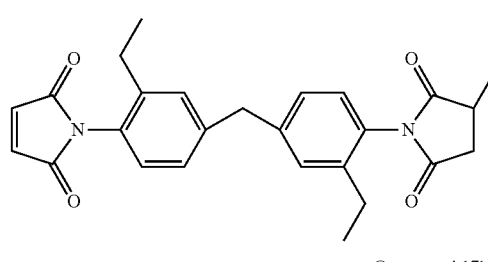

Compound 17b

A 500 ml, one-neck flask was charged with 2.5 g methanesulfonic acid and 150 ml toluene. A Dean-Stark trap and condenser were attached to the flask. The mixture was stirred magnetically and heated to reflux to dehydrate the solution. When the solution cooled, 15.0 g (0.153 mole) maleic anhydride and 13.6 g (0.051 mole) n-dodecenylsuccinic anhydride were added to the mixture. When the solids were completely dissolved, 25.44 g (0.100 mole) 4,4'-methylenebis(2-ethylbenzeneamine) was dripped in. The mixture was refluxed for 3 hours. A total of 3.1 ml water was collected. The solution was cooled and neutralized with 15 g sodium bicarbonate and 3 g water. It was dried with 8 g magnesium sulfate then passed over 20 g silica gel. The toluene was removed via rotary evaporation under vacuum and air sparge.

The product was a clear, light orange, tacky, pliable amorphous compound. It weighed 31.69 g (63.0% theory). An FTIR trace run on this revealed prominent absorptions at 3102, 2965, 2927, 2855, 1778, 1712, 1503, 1380, 1229, 1180, 1150, 1062, 952, 826, and 689 wavenumbers. A portion of this compound was catalyzed with 2% by weight dicumyl peroxide. Differential scanning calorimetry (DSC) on the catalyzed mix revealed a cure onset at 155.9° C., cure maxima at 163.5° C. and cure energy of 280.3 J/g. Thermogravimetric analysis (TGA, ramp rate at 10° C./minute, air purge) run on the catalyzed mix demonstrated residual weights of 99.91%, 99.40%, and 98.65% at 100, 200, and 300° C., respectively. The thermal decomposition onset temperature was 464.2° C.

Example 10

Solubility of Compound Mixtures in Various Monomers

Compound Mixture 2

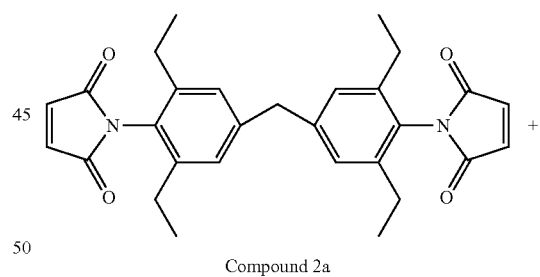

Compound 2a

+

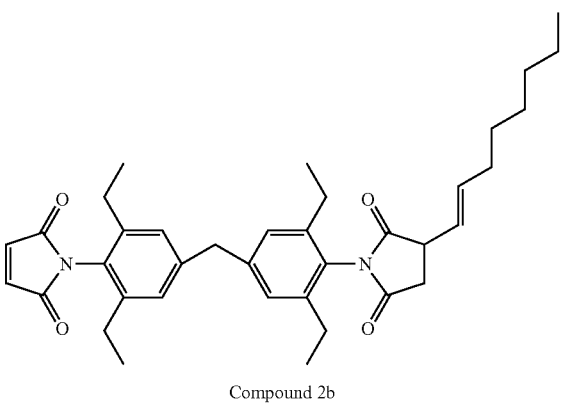

Compound 2b

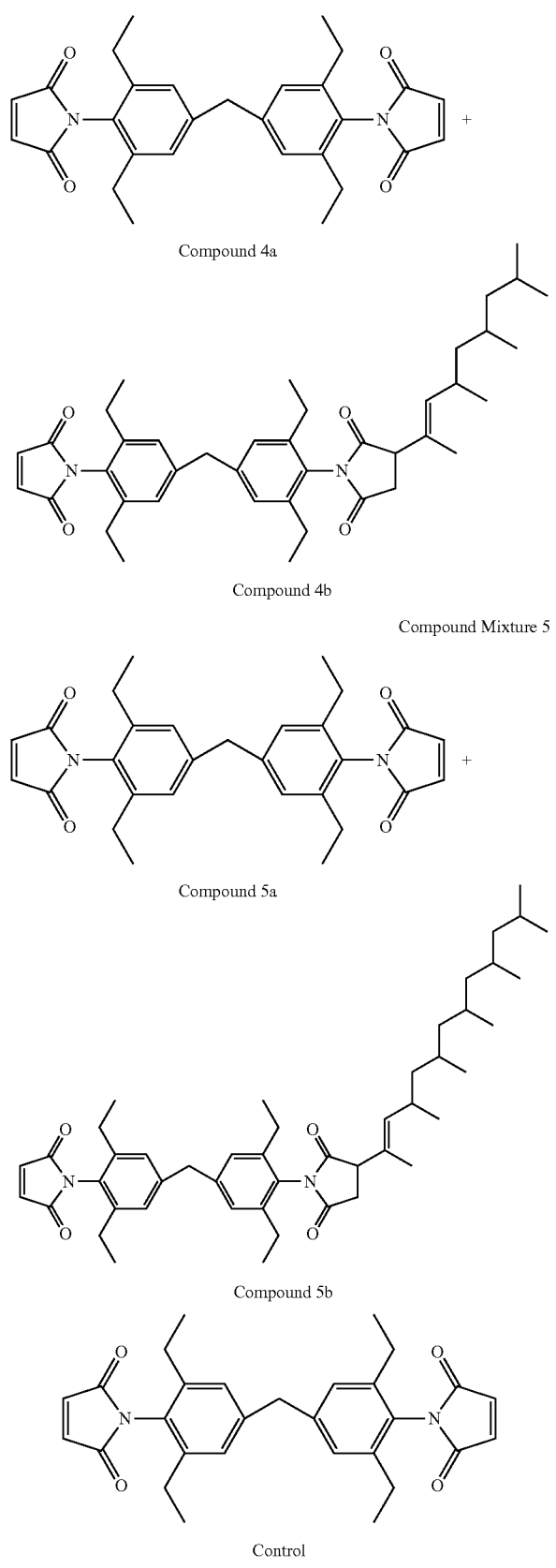

Compound Mixture 4

Compound 4a

Compound 4b

Compound Mixture 5

Compound 5a

Compound 5b

Control

Compound mixtures from some of the previous examples were tested for solubility in a variety of commercially available monomers. The mixtures that were tested are shown above and included compound mixture 2 (comprising compounds 2a and 2b), compound mixture 4 (comprising compounds 4a and 4b) and compound mixture 5 (comprising compounds 5a and 5b).

Each of the compound mixtures and the control (also depicted above) were dissolved in at twenty weight percent (0.5 gram of the test solid in 2.0 grams of the monomer). The samples were heated and stirred to assist the dissolution and then cooled to room temperature. The results of this test are summarized in Table 1.

TABLE 1

Reactive Diluent Compatibility

| | Compound Mixture 2 | Compound Mixture 4 | Compound Mixture 5 | Control |
|---|---|---|---|---|
| tert-Butylstyrene | NS | S | S | NS |
| 2-Phenoxyethyl Acrylate (SR339[a]) | S | S | S | NS |
| n-Lauryl Acrylate (SR355[a]) | NS | NS | NS | NS |
| Dicyclopentyl Acrylate (DCPA[b]) | S* | S | S | NS |
| Isobornyl Acrylate (SR506D[a]) | S* | S | S | NS |
| 2-Phenoxyethyl Methacrylate (SR340[a]) | S | S | S | NS |

Note:
S = Completely soluble at room temperature;
S* = Hazy solution at room temperature;
NS = Not soluble at room temperature.
[a]Monomers from Sartomer Company, Inc., Exton PA, USA.
[b]Monomer from Bimax Chemicals, Ltd., Glen Rock, PA, USA.

None of the invention compounds were soluble in lauryl acrylate at room temperature. Compound 2 was not soluble in t-butylstyrene at room temperature and formed hazy solutions in dicyclopentyl acrylate and isobornyl acrylate. Otherwise, all of the invention compounds tested formed completely soluble, stable solutions in the test monomers. The control compound, by contrast, was insoluble at room temperature in all of the test monomers. This test demonstrates the value of the introduction of asymmetry into the compounds in terms of their improved compatibility with other monomers.

As stated above, the high melting point of the pure BMI compounds is a hindrance to their use in many areas of adhesives technology. The mixed BMI and MI compositions of this invention are amorphous solids. All of the pure BMI compounds, by contrast, are crystalline solids. Some of the various pure BMI's were synthesized and the melting points were determined for comparative purposes. Table 2 shows the melting points, as determined by DSC, for the neat BMI compounds. The high melting points of the neat BMI compounds makes them less useful in liquid adhesive and coating applications than the amorphous, mixed BMI/MI compositions of this invention.

TABLE 2

Melting Points for Neat Bismaleimide Compounds

| Bismaleimide Compound | Melting Point Range (° C.)[a] |
|---|---|
| 1a | 110.5-116.3 |
| 2a-5a | 164.3-167.5 |
| 6a, 8a | 141.6-152.5 |

TABLE 2-continued

Melting Points for Neat Bismaleimide Compounds

| Bismaleimide Compound | Melting Point Range (° C.)[a] |
|---|---|
| 7a | 193.3-197 |
| 9a, 10a, 16a | 94.3-101.0 |
| 11a, 14a, 15a | 83.8-98.9 |
| 17a | 207.3-215.3 |

Note:
[a]All melting points were determined via DSC run at a ramp rate of 5° C./minute. The first number is the onset temperature and the second is the melt peak minimum.

Although the foregoing invention has been described in some detail by way of illustration and example for purposes of clarity and understanding, it will be apparent to those of ordinary skill in the art in light of the teaching of this invention that certain changes and modifications may be made thereto without departing from the spirit or scope of the appended claims.

What is claimed is:

1. A compound mixture, comprising at least one compound of type A, at least one compound of type B and at least one compound of type C

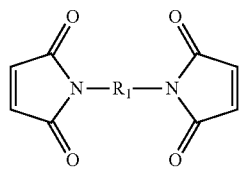

A

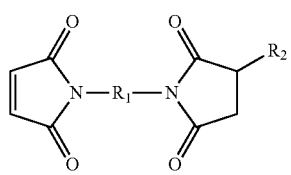

B

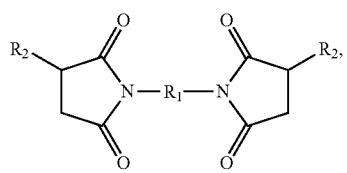

C wherein $R_1$ is selected from the group consisting of an unsubstituted aromatic, a substituted aromatic, an unsubstituted aliphatic, a substituted aliphatic, an unsubstituted cycloaliphatic and a substituted cycloaliphatic moiety, $R_1$ comprising between 2 and about 500 carbon atoms; and $R_2$ is selected from the group consisting of an unsubstituted alkylene, a substituted alkylene, an unsubstituted cycloakylene and a substituted cycloakylene moiety, $R_2$ comprising between 3 and about 36 carbon atoms, wherein the unsubstituted cycloakylene or a substituted cycloalkylene moiety taken together with the maleimide structure to which it is attached optionally forms a condensed ring structure, wherein in the compound mixture the total contents of compound C is between about 3 mol % and about 10 mol % of the mixture.

2. The compound mixture of claim 1, wherein $R_1$ is a substituted or an unsubstituted linear, branched or cyclic aliphatic moiety.

3. The compound mixture of claim 1, wherein $R_1$ is a substituted or an unsubstituted aromatic or heterocyclic moiety having between 6 and about 36 carbons.

4. The compound mixture of claim 1, wherein $R_2$ is an alkylene or a cycloalkylene moiety.

5. The compound mixture of claim 1, wherein the equivalent percent of the maleimide functionality in the mixture is between about 50 mol % and about 95 mol % based on the total imide content.

6. The compound mixture of claim 5, wherein the equivalent percent of maleimide functionality in the mixture is between about 60 mol % and about 90 mol % based on the total imide content.

7. The compound mixture of claim 6, wherein the equivalent percent of maleimide functionality in the mixture is between about 65 mol % and about 85 mol % based on the total imide content.

8. The compound mixture of claim 1, wherein the total contents of compounds A and B is at least 90 mol % of the mixture.

9. The compound mixture of claim 1, wherein the total contents of compounds A and B is at least 95 mol % of the mixture.

10. The compound mixture of claim 1, wherein the total contents of compounds A and B is at least 97 mol % of the mixture.

11. A compound mixture, selected from the group consisting of mixtures 1-17, wherein mixture 1 comprises compounds 1a and 1b, mixture 2 comprises compounds 2a and 2b, mixture 3 comprises compounds 3a, 3b and 3c, mixture 4 comprises compounds 4a and 4b, mixture 5 comprises compounds 5a and 5b, mixture 6 comprises compounds 6a and 6b, mixture 7 comprises compounds 7a and 7b, mixture 8 comprises compounds 8a and 8b, mixture 9 comprises compounds 9a and 9b, mixture 10 comprises compounds 10a and 10b, mixture 11 comprises compounds 11a and 11b, mixture 12 comprises compounds 12a and 12b, mixture 13 comprises compounds 13a and 13b, mixture 14 comprises compounds 14a and 14b, mixture 15 comprises compounds 15a and 15b, mixture 16 comprises compounds 16a and 16b and mixture 17 comprises compounds 17a and 17, wherein in mixture 3 the total contents of compound 3c is between about 3 mol % and about 10 mol % of the mixture:

Mixture 1
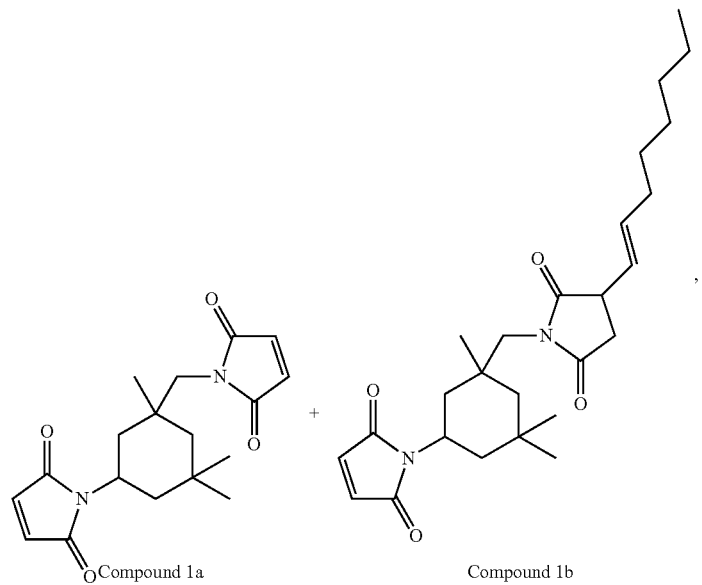
Compound 1a    Compound 1b
Mixture 2
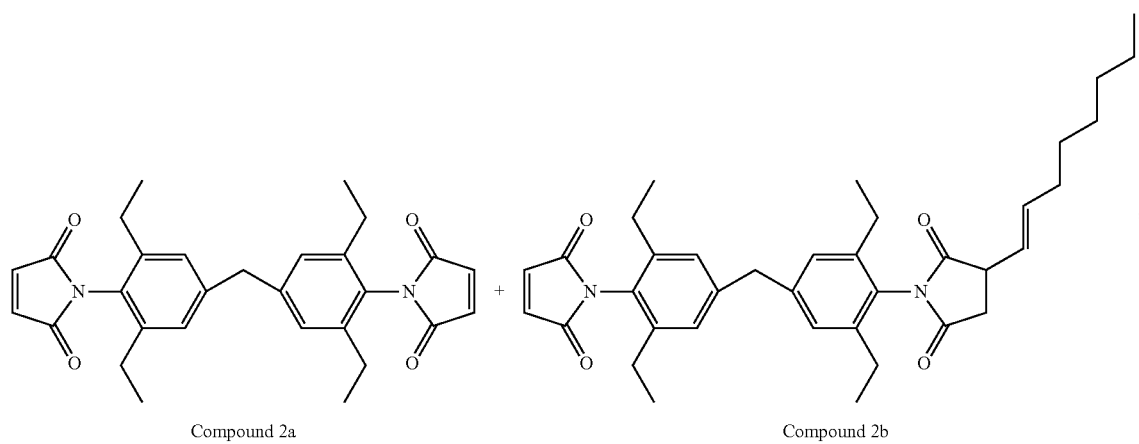
Compound 2a    Compound 2b
Mixture 3
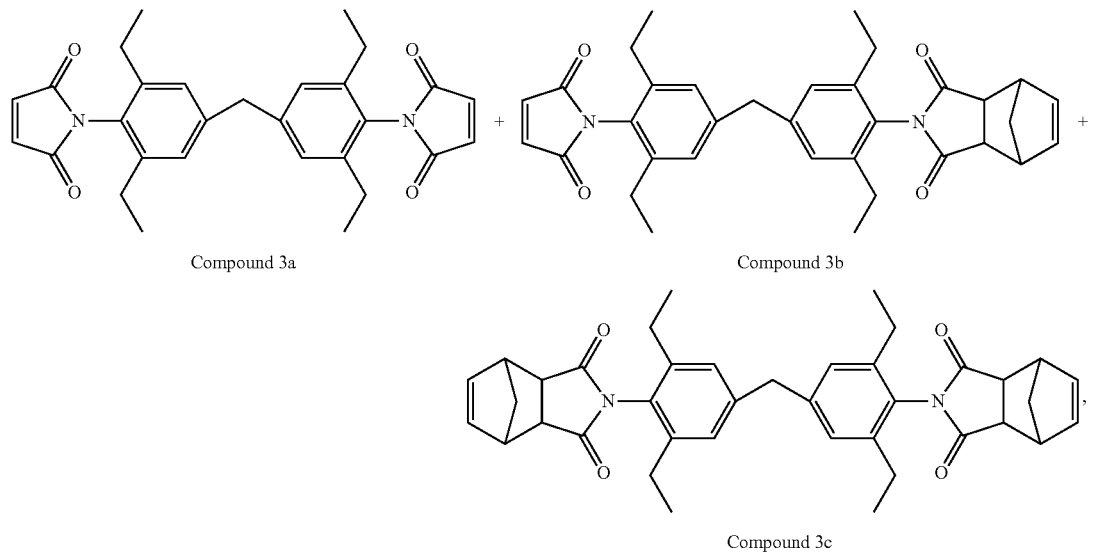
Compound 3a    Compound 3b
Compound 3c Mixture 4
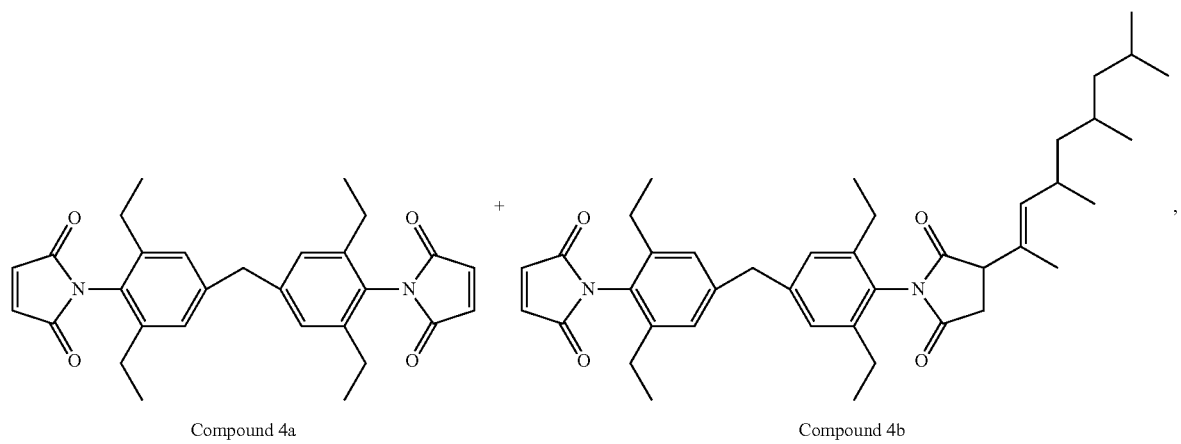
Compound 4a     Compound 4b
Mixture 5
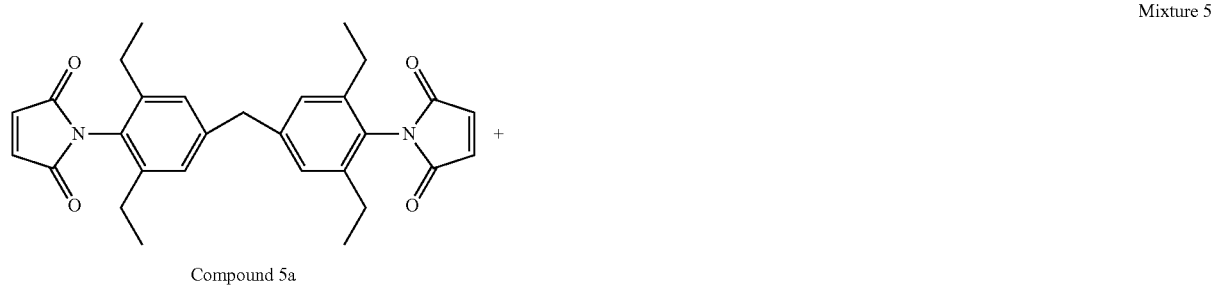
Compound 5a
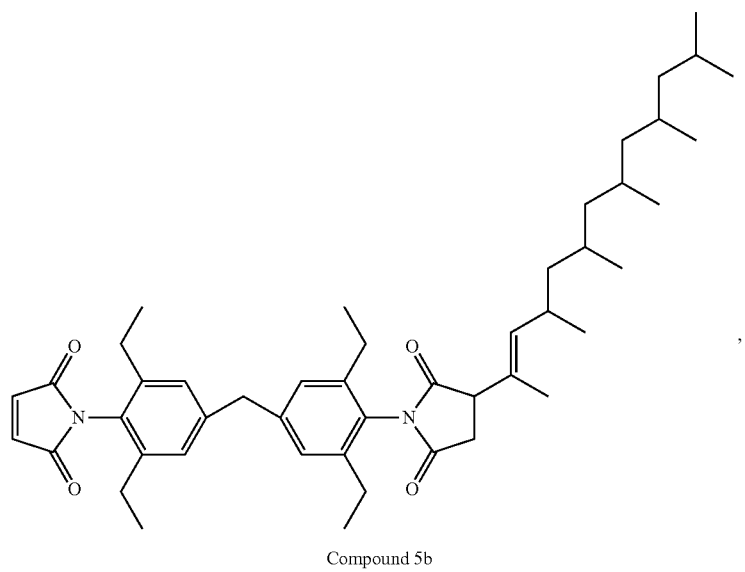
Compound 5b

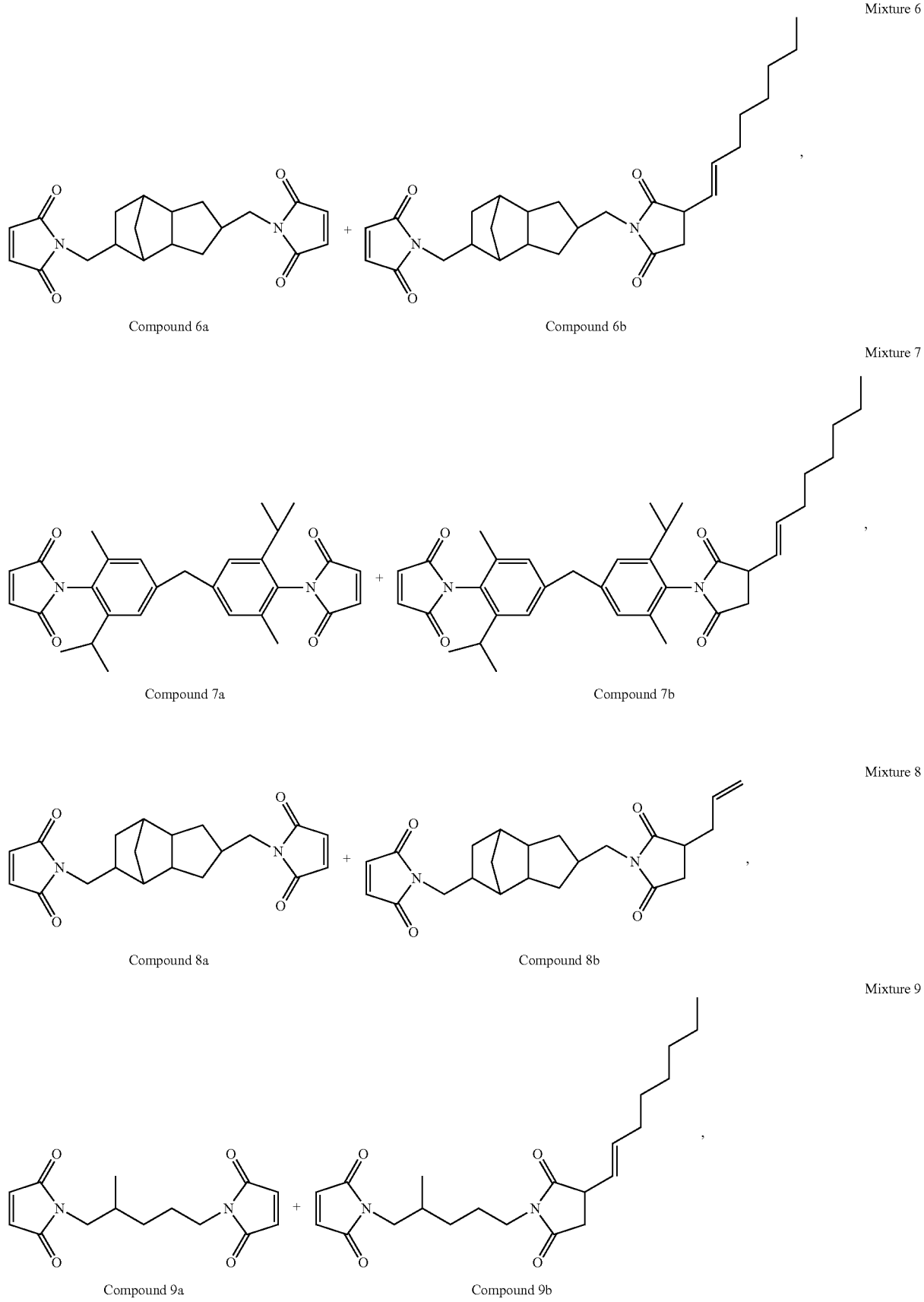

Mixture 10
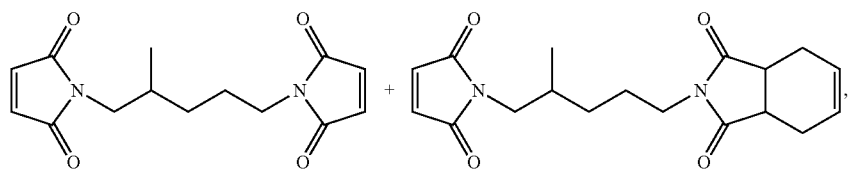
Compound 10a      Compound 10b
Mixture 11
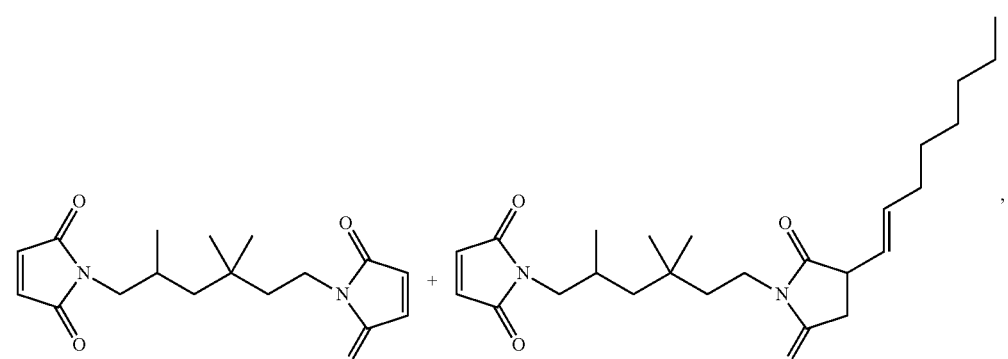
Compound 11a      Compound 11b
Mixture 12
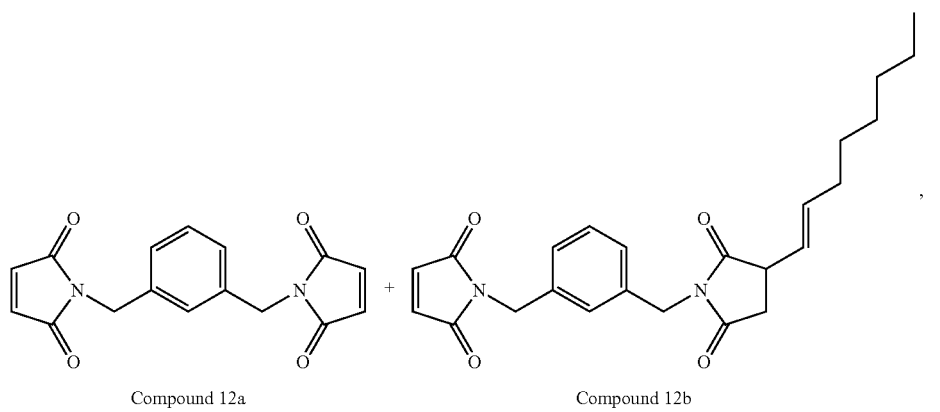
Compound 12a      Compound 12b
Mixture 13
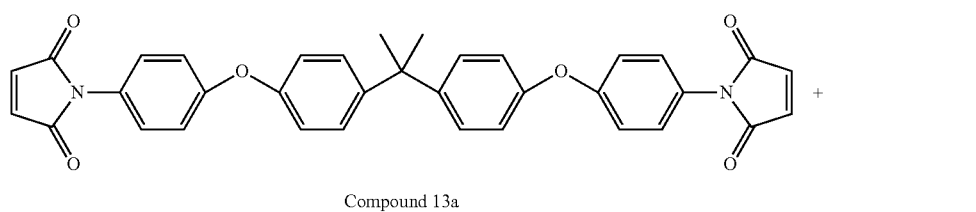
Compound 13a
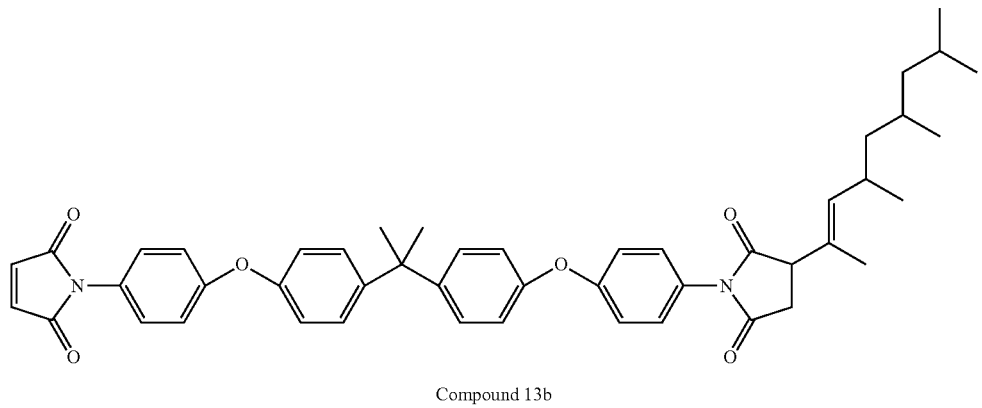
Compound 13b -continued
Mixture 14
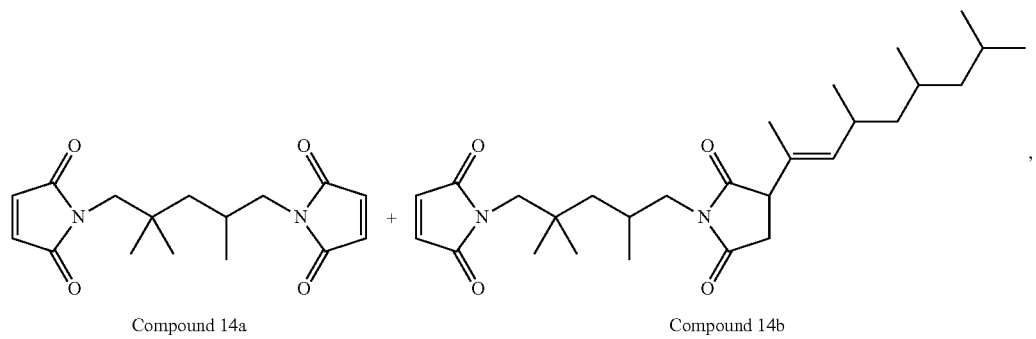
Compound 14a + Compound 14b
Mixture 15
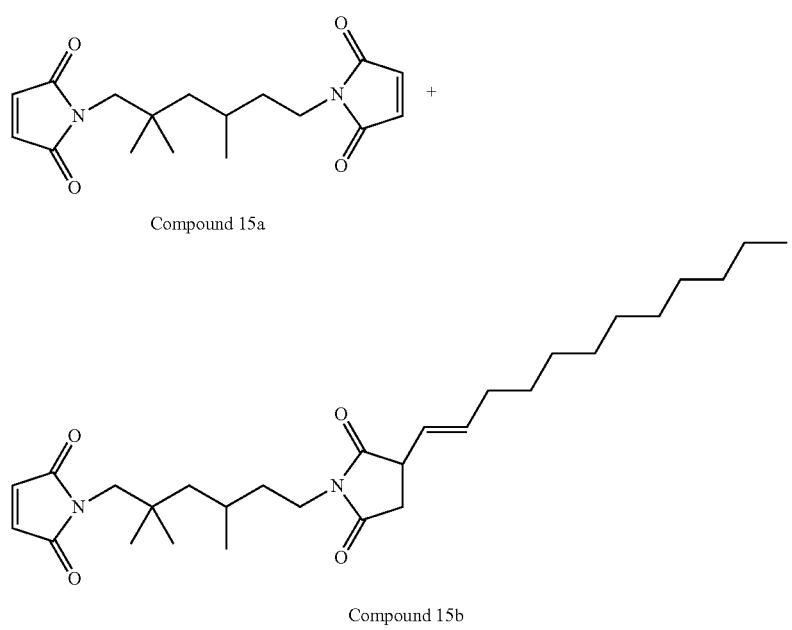
Compound 15a +
Compound 15b
Mixture 16
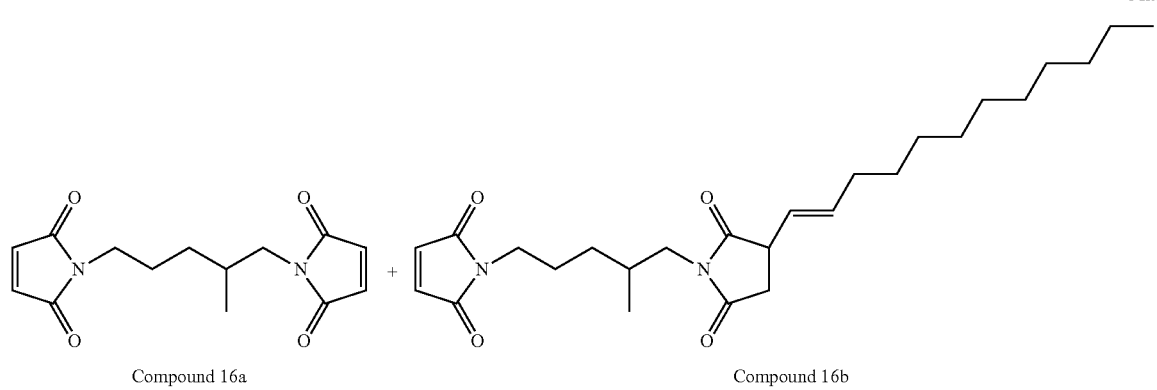
Compound 16a + Compound 16b
Mixture 17
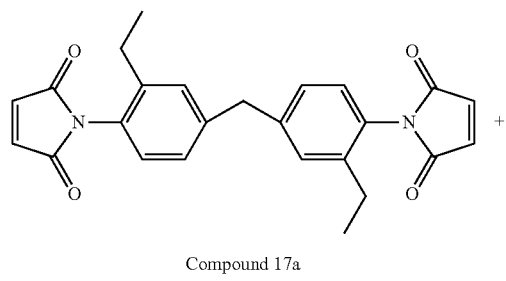
Compound 17a +

-continued

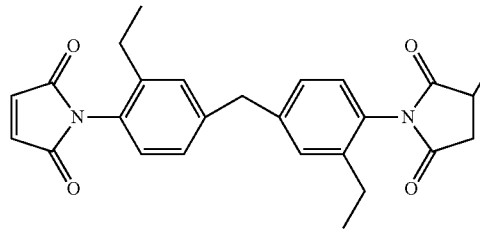

Compound 17b

12. An adhesive composition comprising:
(a) a compound mixture comprising at least one compound of type A, at least one compound of type B and at least one compound of type C

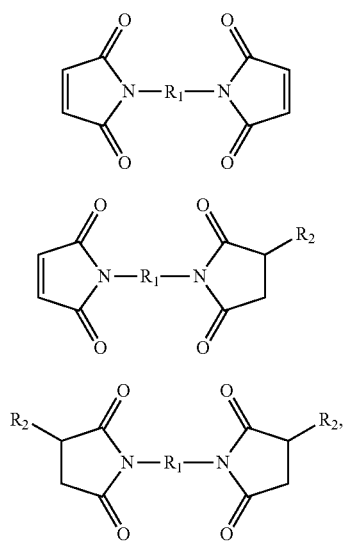

wherein $R_1$ is selected from the group consisting of an unsubstituted aromatic, a substituted aromatic, an unsubstituted aliphatic, a substituted aliphatic, an unsubstituted cycloaliphatic and a substituted cycloaliphatic moiety, $R_1$ comprising between 2 and about 500 carbon atoms; and $R_2$ is selected from the group consisting of an unsubstituted alkylene, a substituted alkylene, an unsubstituted cycloakylene and a substituted cycloakylene moiety, $R_2$ comprising between 3 and about 36 carbon atoms, wherein the unsubstituted cycloakylene or a substituted cycloalkylene moiety taken together with the maleimide structure to which it is attached optionally forms a condensed ring structure;

(b) at least one co-monomer selected from the group consisting of acrylates, methacrylates, maleimides, vinyl ethers, vinyl esters, acrylamides, methacrylamides, maleates, itaconates, fumarates, styrenic compounds, allylic functionalized compounds, epoxies, phenolics and phenyl esters;

(c) at least one curing initiator;
(d) a coupling agent; and
(e) a filler.

13. The adhesive composition of claim 12, wherein the compound mixture comprises between about 0.5 wt % and about 98 wt % based on the total weight of the composition.

14. The adhesive composition of claim 12, wherein one of the co-monomers comprises between about 10 wt % and about 90 wt % based on the total weight of the composition.

15. The adhesive composition of claim 12, wherein one of the curing initiators comprises between about 0.1 wt % and about 5 wt % based on the total weight of the composition.

16. The adhesive composition of claim 12, wherein the curing initiator comprises a free-radical initiator, a photo initiator, a cationic initiator, an anionic initiator or a combination thereof.

17. The adhesive composition of claim 12, wherein the filler is electrically conductive or thermally conductive.

* * * * *